US006470292B1

(12) United States Patent
Tanaka et al.

(10) Patent No.: US 6,470,292 B1
(45) Date of Patent: Oct. 22, 2002

(54) POSITION DETECTION APPARATUS

(75) Inventors: Masato Tanaka, Tokyo; Shigeru Ishimoto, Kanagawa; Toyohiko Matsuda, Kanagawa; Katsumi Kitamura, Kanagawa, all of (JP)

(73) Assignee: Sony Precision Technology Inc., Tokyo (JP)

( * ) Notice: Subject to any disclaimer, the term of this patent is extended or adjusted under 35 U.S.C. 154(b) by 102 days.

(21) Appl. No.: 09/649,335

(22) Filed: Aug. 28, 2000

(30) Foreign Application Priority Data

Aug. 31, 1999 (JP) ............................................ 11-246510

(51) Int. Cl.[7] ............................ G01C 9/00; G06F 15/00
(52) U.S. Cl. ....................... 702/150; 702/94; 702/151; 700/186; 700/193

(58) Field of Search .................................. 702/150, 151, 702/152, 153, 94–95; 73/649, 657; 700/186, 189, 193

(56) References Cited

U.S. PATENT DOCUMENTS

| 5,485,407 A | * | 1/1996 | Ishimoto et al. ............... 702/94 |
| 5,970,432 A | * | 10/1999 | Ishimoto et al. ............ 702/150 |
| 6,031,885 A | * | 2/2000 | Ishimoto et al. ............ 375/371 |
| 6,070,132 A | * | 5/2000 | Ishimoto ..................... 702/158 |

* cited by examiner

*Primary Examiner*—Bryan Bui
(74) *Attorney, Agent, or Firm*—Jay H. Maioli

(57) ABSTRACT

A position detector detects the position of a detector section relative to a record medium having recorded thereon a periodic position signal. The detector section has two detectors that produce first and second detection signals that are polar converted and processed, based on the number of divisions in a quadrant of the periodic position signal.

2 Claims, 22 Drawing Sheets

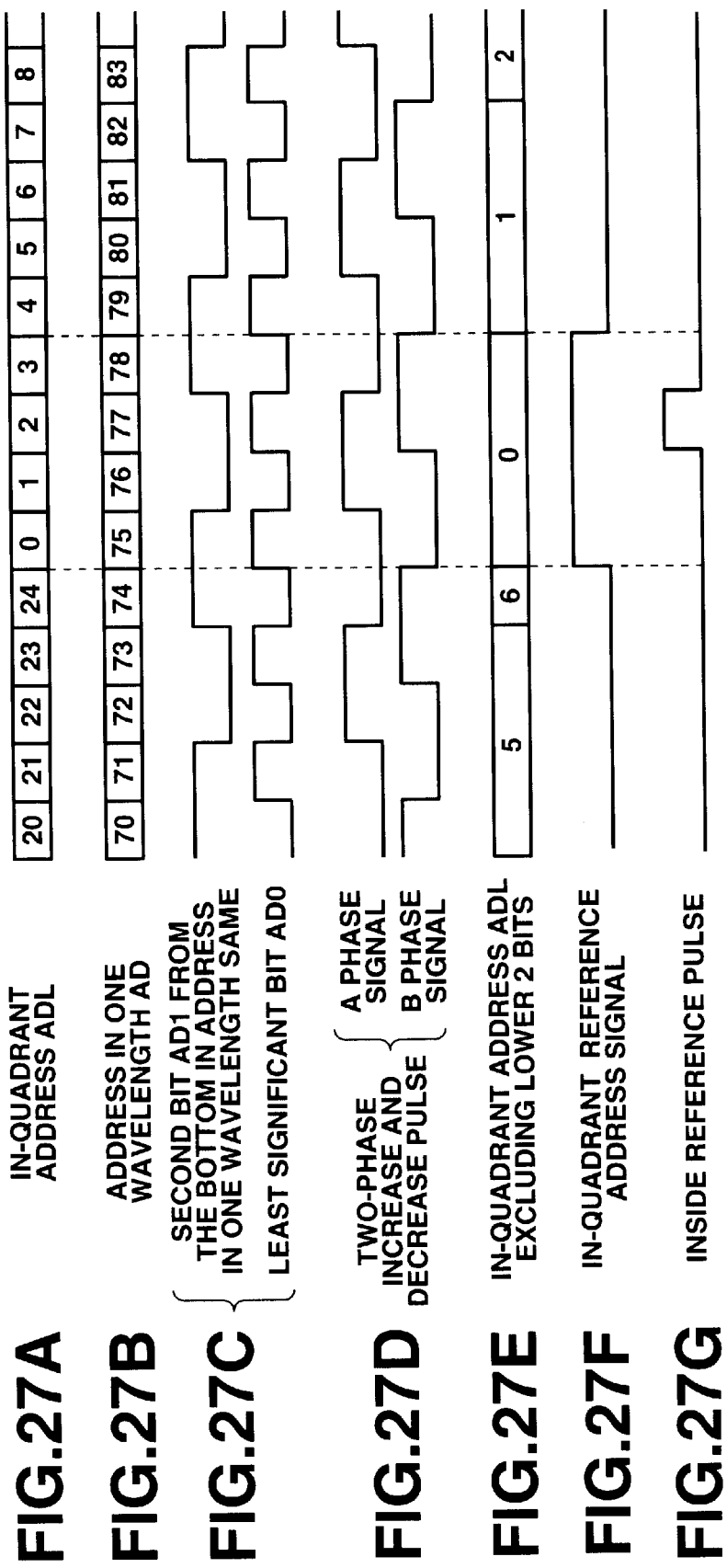

ONE WAVELENGTH DIVISION UNIT ADDRESS PD (ADDRESS IN ONE WAVELENGTH AD)=
CORRECTED ADDRESS PC +
IN-QUADRANT DIVISION UNIT ADDRESS PDL (IN-QUADRANT ADDRESS ADL)

| OUTPUT OF CORRECTION ADDER | OUTPUT OF SECOND MULTIPLIER | OUTPUT OF SECOND MULTIPLIER | |
|---|---|---|---|
| (PD25)=(AD11) | (PC25)=(AC11) | | |
| (PD24)=(AD10) | (PC24)=(AC10) | | |
| (PD23)=(AD9) | (PC23)=(AC9) | PDL23=ADL9 | |
| (PD22)=(AD8) | (PC22)=(AC8) | PDL22=ADL8 | |
| (PD21)=(AD7) | (PC21)=(AC7) | PDL21=ADL7 | |
| (PD20)=(AD6) | (PC20)=(AC6) | PDL20=ADL6 | |
| (PD19)=(AD5) | (PC19)=(AC5) | PDL19=ADL5 | |
| (PD18)=(AD4) | (PC18)=(AC4) | PDL18=ADL4 | |
| (PD17)=(AD3) | (PC17)=(AC3) | PDL17=ADL3 | |
| (PD16)=(AD2) | (PC16)=(AC2) | PDL16=ADL2 | |
| PD15=AD1 | PC15=AC1 | PDL15=ADL1 | FOR INCREASE/DECREASE PULSE GENERATION |
| PD14=AD0 | PC14=AC0 | PDL14=ADL0 | ← DECIMAL POINT POSITION IN DIVISION ADDRESS |
| (PD13) | | PDL13 | |
| (PD12) | | PDL12 | |
| (PD11) | | PDL11 | |
| (PD10) | | PDL10 | |
| (PD9) | | PDL9 | |
| (PD8) | | PDL8 | |
| (PD7) | | PDL7 | |
| (PD6) | | PDL6 | |
| (PD5) | | PDL5 | |
| (PD4) | | PDL4 | |
| (PD3) | | PDL3 | |
| (PD2) | | PDL2 | |
| (PD1) | | PDL1 | |
| (PD0) | | PDL0 | |

FIG.29

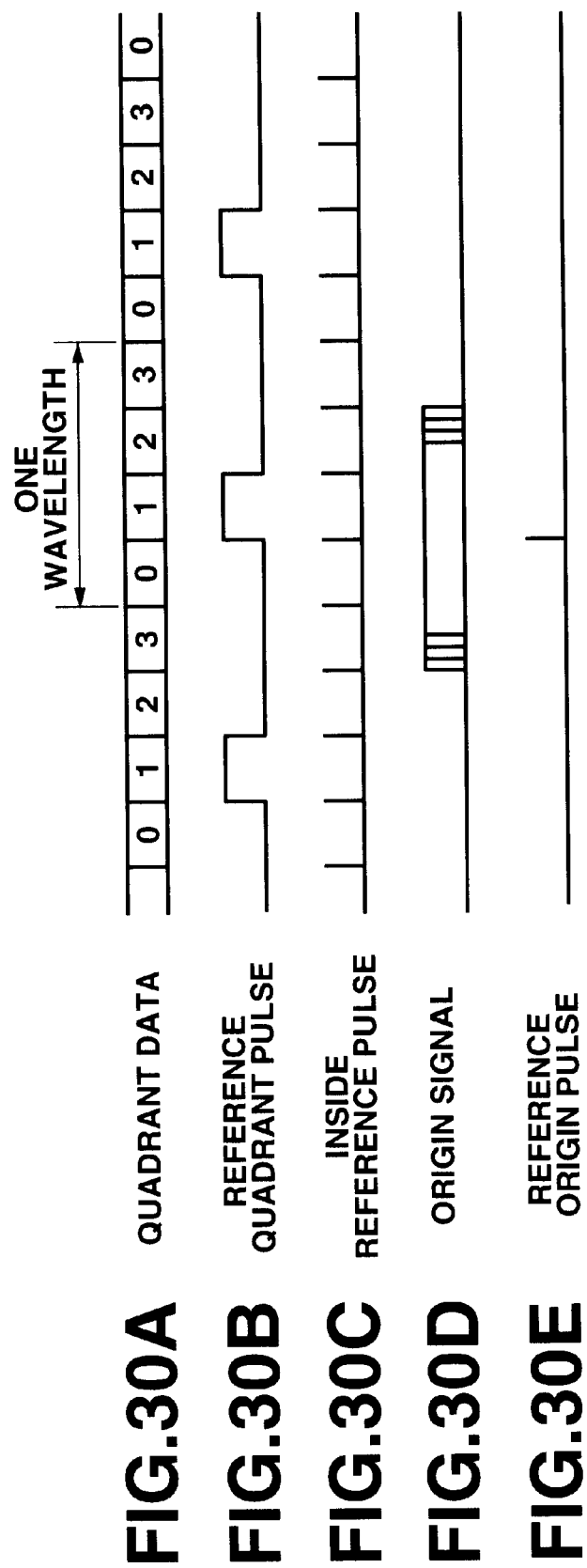

POSITION DETECTION APPARATUS

BACKGROUND OF THE INVENTION

1. Field of the Invention

The present invention relates to a position detection apparatus for detecting a position of movement of two members which move relative to each other.

2. Description of the Related Art

Heretofore, a position detection apparatus for detecting a position of movement of two members which move relative to each other is well known. This position detection apparatus comprises a scale on which a periodic signal whose signal level varies in a certain wavelength is recorded along a certain direction, a head section for detecting the periodic signal recorded on the scale, and an arithmetic processing section for performing signal processing of the periodic signal detected by the head section to output position information. The scale and the head section are fitted to a moving element and a base element of two members moving relative to each other. The position detection apparatus detects with the scale the periodic signal whose signal level changes, and supplies the detected periodic signal to the arithmetic processing section. The arithmetic processing section outputs position information showing a position of relative movement of the two members, based on the periodic signal detected by the head section.

The position detection apparatus generally outputs a two-phase increase and decrease pulse, a so-called A/B phase signal, as position information. The two-phase increase and decrease pulse is composed of two signals, A phase signal and B phase signal, which have the same period to each other and whose phases are shifted by ¼ period. The two-phase increase and decrease pulse is a signal showing a Gray coded two-bit count value, with the A phase signal designated as a lower bit, and the B phase signal designated as an upper bit. This count value shows a quantity of relative movement. In this manner, if the two-phase increase and decrease pulse is transmitted as position information, the quantity of information to be transmitted can be reduced. Moreover, since the displacement is shown using the Gray code, the direction of movement can also be transmitted clearly. Then, a control unit or the like which obtains the two-phase increase and decrease pulse from the position detection apparatus 1 as position information cumulatively adds (subtracts when two members move in the negative direction) the number of count of the two-phase increase and decrease pulse, to thereby determine the quantity of relative movement of two members, thereby controls a position of movement of two members.

Moreover, an origin signal showing an origin of the relative movement position is recorded on the scale together with the periodic signal. The position detection apparatus outputs a reference origin pulse, when the head section detects the origin signal recorded on the scale. A control unit or the like which has obtained the reference origin pulse starts counting the two-phase increase and decrease pulse from the time when the reference origin pulse is output.

With the position detection apparatus, one wavelength of the periodic signal recorded on the scale is further divided, to thereby detect a movement position of two members which move relative to each other. For example, one wavelength is divided into 40, 100, 360, 1000 or the like to perform position detection.

With a conventional position detection apparatus, when one wavelength of the periodic signal is further divided in such a manner, the two-phase increase and decrease pulse to be output is generated, using a conversion table wherein angle data obtained by performing polar conversion with respect to the periodic signal and signal level data of the periodic signal are designated as an address. However, the size of the conversion table is very large to correspond to many kinds of the number of divisions, causing cost increase. Moreover, quantize error occurs due to the conversion table, resulting in deterioration in the precision.

Furthermore, with the position detection apparatus, the two-phase increase and decrease pulse for outputting the position information divided by a predetermined number of divisions must be output synchronously with the origin signal.

BRIEF SUMMARY OF THE INVENTION

It is an object of the present invention to provide a position detection apparatus which can divide one wavelength of a periodic signal recorded on a recording medium by an optional number of divisions and calculate and output a two-phase increase and decrease pulse which increases or decreases depending on the movement per unit of number of divisions with a small quantity of arithmetic operation.

Moreover, it is an object of the present invention to provide a position detection apparatus which can output a reference origin pulse synchronized with the two-phase increase and decrease pulse, as well as calculating and outputting the two-phase increase and decrease pulse with a small quantity of arithmetic operation.

To solve the above-described problems, the position detection apparatus according to the present invention comprises: a recording medium on which a position signal comprising a periodic signal is recorded; a detection section comprising a first detection head which moves relative to the recording medium along the recording direction of the position signal for detecting the position signal, and a second detection head which is disposed apart from the first detection head by a predetermined distance in the recording direction of the position signal, and moves relative to the recording medium, operating together with the first detection head for detecting the position signal; a polar conversion section for converting the position signal detected by the first detection head and the second detection head into 2-bit quadrant signal showing a relative position of the recording medium and the detection section in a unit of quadrant in one period of the position signal, and an in-quadrant angle signal showing a relative position of the recording medium and the detection section as an angle in each quadrant; and an output section for outputting a two-phase increase and decrease pulse, based on the quadrant signal, the in-quadrant angle signal and a number of divisions signal showing a number of divisions in the quadrant of the position signal, such that one pulse is generated when the recording medium and the detection section move relative to each other for a distance obtained by dividing one quadrant of the position signal by the number of divisions.

The output section of this position detection apparatus comprises: a first multiplier for multiplying the in-quadrant angle signal and the number of divisions signal, and extracting a bit number same as the number of divisions signal from the upper bit of the multiplication result to thereby generate an in-quadrant division address signal; a second multiplier for multiplying lower 2 bits of the number of divisions signal and the quadrant signal; an adder for adding lower 2 bits of the in-quadrant division address signal output from the first multiplier and lower 2 bits in the multiplication result of the second multiplier; and an increase and decrease pulse generator for generating the two-phase increase and decrease pulse by encoding the lower 2 bits in the multiplication result of the adder.

With this position detection apparatus, the in-quadrant angle signal and the number of divisions signal are multiplied, and the upper bit is extracted to generate an in-quadrant division address signal, then the lower 2 bits from the multiplication result of multiplying lower 2 bits of the number of divisions signal and the quadrant signal, and lower 2 bits of the in-quadrant division address signal are added, to generate a two-phase increase and decrease pulse based on the lower 2 bits in the added result.

Moreover, the position detection apparatus according to the present invention comprises: a recording medium on which a position signal comprising a periodic signal and an origin signal showing an origin position of the position signal are recorded; a detection section comprising a first detection head which moves relative to the recording medium along the recording direction of the position signal for detecting the position signal, a second detection head which is disposed apart from the first detection head by a predetermined distance in the recording direction of the position signal, and moves relative to the recording medium, operating together with the first detection head for detecting the position signal, and a third detection head which moves relative to the recording medium, operating together with the first detection head for detecting the origin signal; a polar conversion section for converting the position signal detected by the first detection head and the second detection head into 2-bit quadrant signal showing a relative position of the recording medium and the detection section in a unit of quadrant in one period of the position signal, and an in-quadrant angle signal showing a relative position of the recording medium and the detection section as an angle in each quadrant; and an output section for outputting a two-phase increase and decrease pulse, based on the quadrant signal, the in-quadrant angle signal, the origin signal detected by the third detection head and a number of divisions signal showing a number of divisions in the quadrant of the position signal, such that one pulse is generated when the recording medium and the detection section move relative to each other for a distance obtained by dividing one quadrant of the position signal by the number of divisions, and a reference origin pulse generated when the position of relative movement of the recording medium and the detection section is the origin position.

The output section of the position detection apparatus comprises: a first multiplier for multiplying the in-quadrant angle signal and the number of divisions signal, and extracting a bit number same as the number of divisions signal from the upper bit in the multiplication result to thereby generate an in-quadrant division address signal; a second multiplier for multiplying lower 2 bits of the number of divisions signal and the quadrant signal; an adder for adding lower 2 bits of the in-quadrant division address signal output from the first multiplier and lower 2 bits in the multiplication result of the second multiplier; an increase and decrease pulse generator for generating the two-phase increase and decrease pulse by encoding the lower 2 bits in the multiplication result of the adder; an in-quadrant reference address generator for generating an in-quadrant reference address signal, when a signal excluding the lower 2 bits of the in-quadrant division address signal is a predetermined signal; and an origin signal generator for generating the reference origin pulse, when the origin signal is detected by the third detection head, the quadrant signal is a predetermined quadrant, the in-quadrant reference address signal is generated, and the two-phase increase and decrease pulse is a predetermined phase.

With this position detection apparatus, the in-quadrant angle signal and the number of divisions signal are multiplied, and the upper bit is extracted to generate an in-quadrant division address signal, then the lower 2 bits from the multiplication result of multiplying lower 2 bits of the number of divisions signal and the quadrant signal, and lower 2 bits of the in-quadrant division address signal are added, to generate a two-phase increase and decrease pulse based on the lower 2 bits in the added result. Moreover, with this position detection apparatus, when a signal excluding the lower 2 bits of the in-quadrant division address signal is a predetermined signal, the in-quadrant reference address signal is generated, and the reference origin pulse is generated, when the origin signal is detected by the third detection head, the quadrant signal is a predetermined quadrant, the in-quadrant reference address signal is generated, and the two-phase increase and decrease pulse is a predetermined phase.

With the position detection apparatus according to the present invention, the in-quadrant angle signal and the number of divisions signal are multiplied, and the upper bit is extracted to generate an in-quadrant division address signal, then the lower 2 bits from the multiplication result of multiplying lower 2 bits of the number of divisions signal and the quadrant signal, and lower 2 bits of the in-quadrant division address signal are added, to generate a two-phase increase and decrease pulse based on the lower 2 bits in the added result.

Thereby, with this position detection apparatus, the two-phase increase and decrease pulse which increases or decreases in a unit obtained by dividing one wavelength of the position signal recorded on a recording medium by an optional number of divisions can be calculated with a small quantity of arithmetic operation and output.

Furthermore, with the position detection apparatus according to the present invention, the in-quadrant angle signal and the number of divisions signal are multiplied, and the upper bit is extracted to generate an in-quadrant division address signal, then the lower 2 bits from the multiplication result of multiplying lower 2 bits of the number of divisions signal and the quadrant signal, and lower 2 bits of the in-quadrant division address signal are added, to generate a two-phase increase and decrease pulse based on the lower 2 bits in the added result. Moreover, with this position detection apparatus, when a signal excluding the lower 2 bits of the in-quadrant division address signal is a predetermined signal, the in-quadrant reference address signal is generated, and the reference origin pulse is generated, when the origin signal is detected by the third detection head, the quadrant signal is a predetermined quadrant, the in-quadrant reference address signal is generated, and the two-phase increase and decrease pulse is a predetermined phase.

Thereby, with this position detection apparatus, the two-phase increase and decrease pulse which increases or decreases in a unit obtained by dividing one wavelength of the position signal recorded on a recording medium by an optional number of divisions can be calculated with a small quantity of arithmetic operation and output. Moreover, with this position detection apparatus, the reference origin pulse synchronized with the two-phase increase and decrease signal can be output at a predetermined one place on the recording medium.

BRIEF DESCRIPTION OF THE SEVERAL VIEWS OF THE DRAWING

FIG. 27 is a timing chart for explaining the operation for generating a two-phase increase and decrease signal and an inside reference pulse by means of the output pulse generation section;

FIG. 29 is a diagram for explaining the calculation for generating the two-phase increase and decrease pulse generated by the output pulse generation section; and FIG. 30 is a timing chart for explaining the operation for generating a reference origin pulse by the output pulse generation section.

DETAILED DESCRIPTION OF THE INVENTION

A position detection apparatus for detecting a linear movement position such as a machine tool which moves linearly (for example, a machine tool having two members comprising a fixed section and a mobile section) will now be described as an embodiment of the present invention, with reference to drawings.

Figure 1:
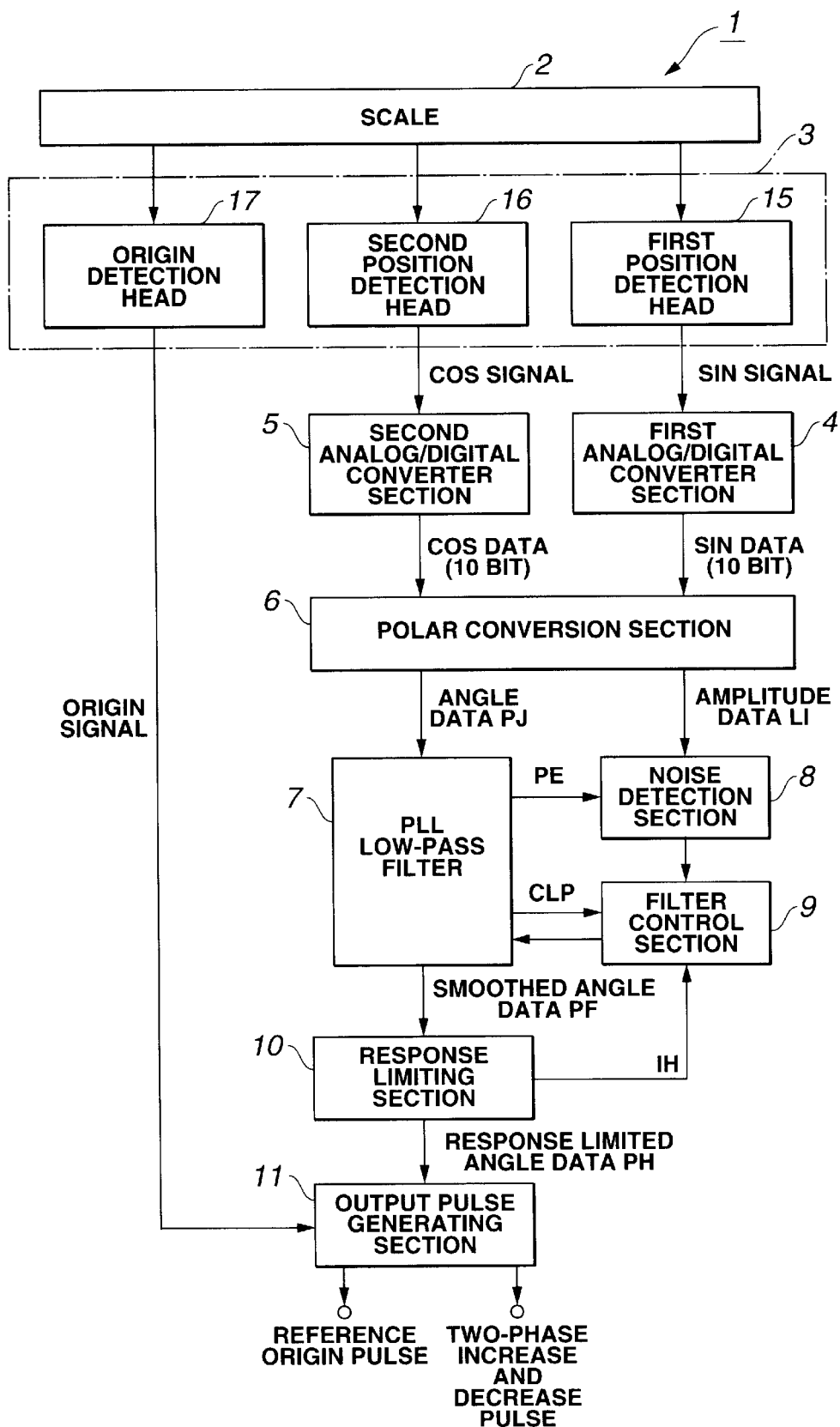
FIG. 1 is a block diagram of a position detection apparatus which applies the present invention.

FIG. 1 shows a block diagram of a position detection apparatus which applies the present invention.

The position detection apparatus 1 comprises, as shown in FIG. 1, a scale 2, a head section 3, a first analog/digital conversion section 4, a second analog/digital conversion section 5, a polar conversion section 6, a PLL low pass filter 7, a noise detection section 8, a filter control section 9, a response limiting section 10, and an output pulse generating section 11.

With the position detection apparatus 1, the scale 2 and the head section 3 are respectively fitted to two members which move linearly, for detecting a position of relative movement of these two members. For example, the scale 2 is fitted to a mobile section of the two members, and the head portion 3 is fitted to the fixed section of the two members. With the position detection apparatus 1, a position signal and an origin signal are recorded on the scale 2, and the head section 3 detects the position signal and the origin signal recorded on the scale 2, depending on the linear movement of a machine tool or the like, to thereby output movement position information of the machine tool or the like. A two-phase increase and decrease pulse generated from a position signal and a reference origin pulse generated from the origin signal are output from the position detection apparatus 1 as movement position information of the machine tool or the like. The movement position information is transmitted to a control unit or the like and used for operation control of the machine tool.

Figures 2A, 2B:
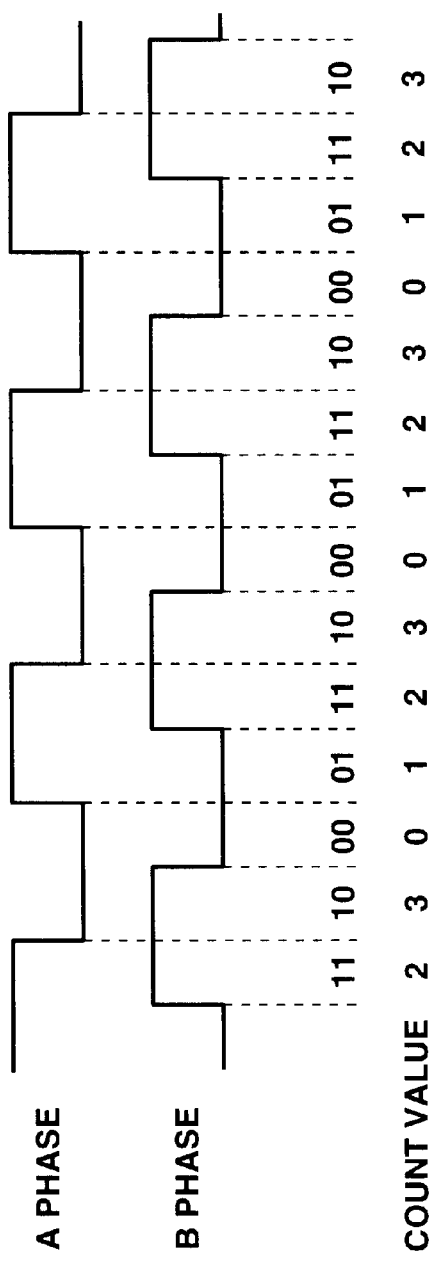
FIG. 2(A) is a diagram showing a signal waveform of a two-phase increase and decrease pulse output from the position detection apparatus.
FIG. 2(B) is a diagram for explaining a count value of the two-phase increase and decrease signal.

The two-phase increase and decrease pulse output as the movement position information of the position detection apparatus 1 is a signal referred to as a so-called A/B phase signal. The two-phase increase and decrease pulse is, as shown in FIG. 2(A), composed of two signals of an A phase signal and a B phase signal, which have the same period to each other and whose phases are shifted by ¼ period. The two-phase increase and decrease pulse is a signal showing a Gray-coded two-bit count value, with the A phase signal being designated as a lower bit, and the B phase signal being designated as an upper bit. That is to say, the two-phase increase and decrease pulse is a signal showing a count value, designating four-counts from 0 to 3 as one period, such that as the phase proceeds to the positive direction, the value is incremented by 1, and as the phase proceeds to the negative direction, the value is decremented by 1. One count of the two-phase increase and decrease pulse output from the position detection apparatus 1 shows a resolution of the movement quantity to be detected. Therefore, when the machine tool moves relative to each other for the amount of this resolution, the two-phase increase and decrease pulse increases or decreases by one count. For example, if it is assumed that the resolution of the position detection apparatus 1 is 1 μm, when the machine tool moves by 1 μm in the position direction, the two-phase increase and decrease pulse increases by one count. On the other hand, when the machine tool moves by 1 μm in the negative direction, the two-phase increase and decrease pulse decreases by one count. Such a two-phase increase and decrease pulse may have a considerably small amount of information to be transmitted, and since the movement quantity is shown using a Gray code, the movement direction can be also transmitted clearly. The control unit or the like that has acquired the two-phase increase and decrease pulse as the movement position information from the position detection apparatus 1 can detect the quantity of relative movement of the machine tool by cumulatively adding (subtracting at the time of movement in the negative direction) the count number of the two-phase increase and decrease pulse.

Furthermore, the reference origin pulse is information showing a reference point of the movement position of the machine tool, and generated when the movement position of the machine tool moving relative to each other is in a reference position. For example, if the machine tool comprises two members which move linearly, the reference origin pulse is generated at the center position of the movement range or at the end position thereof. The control unit or the like that has acquired the reference origin pulse as the movement position information from the position detection apparatus 1 clears the comulative addition value of the two-phase increase and decrease pulse to 0, when the reference origin pulse is generated, to thereby perform cumulative addition of the count value of the two-phase increase and decrease pulse from this reference position, and as a result, the movement position of the machine tool can be specified.

As described above, the position detection apparatus 1 can provide movement position information of a machine tool to the control unit that controls the operation of the machine tool.

Respective constituents of the position detection apparatus 1 will now be described in detail.

(Scale)

Figure 3:
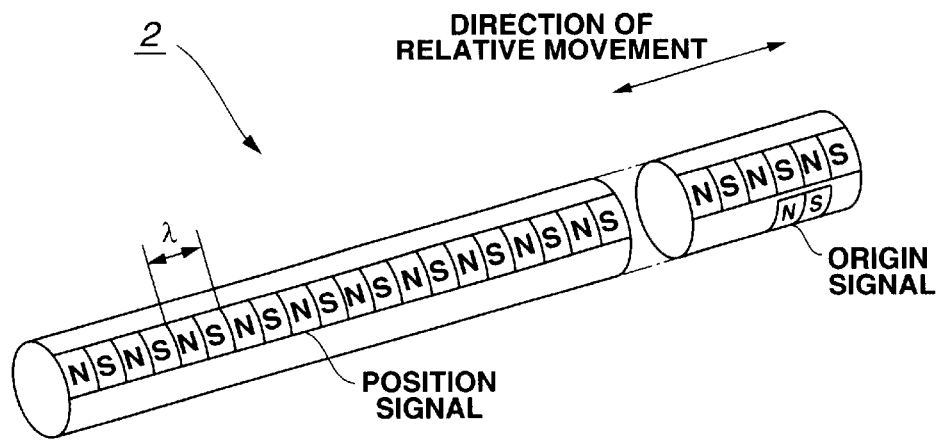
FIG. 3 is a diagram for explaining a scale provided in the position detection apparatus, and a position signal and an origin signal recorded on the scale.

The scale 2 has a lengthy shape, as shown in FIG. 3. The scale 2 is fitted to one member of two members moving linearly, for example, a mobile section such that the longitudinal direction is in parallel to the moving direction of the two members. Magnetic signals repeated with a predetermined wavelength λ, are recorded along the longitudinal direction in the scale 2 as a position signal. Moreover, a magnetic signal for one wavelength λ is recorded as an origin signal in one place in the longitudinal direction.

The shape of the scale 2 is decided depending on the contents of the relative movement of a machine tool whose movement position is detected. For example, when a movement position of a machine tool which moves linearly is to be detected, it is preferable that the scale 2 has a lengthy shape as shown in FIG. 3, but when a rotation position of a member which moves rotationally is to be detected, the scale 2 has preferably a disc shape. Moreover, the position signal is a periodic signal repeated with a certain wavelength, and is not limited to the magnetic signal and may be any signal, so long as it is recorded along the direction of relative movement. For example, the position signal may be an optically detected signal. In addition, for example, when a rotational movement position is to be detected using a scale in a disc shape, the recorded position of the position signal is generally recorded in an arc portion of the scale. Furthermore, the origin signal is a signal showing a reference point of a movement position of a machine tool, and has only to be recorded at one place in the moving direction of the machine tool. The origin signal is also not limited to the magnetic signal, and for example, may be an optically detected signal. In an example shown in FIG. 3, the origin signal is recorded in a different position from the position signal on the circumference of the scale 2 in a round bar shape, but may be recorded, placed on the position signal, designating the recording wavelength as one different from that of position signal.

(Head Section)

Figure 4:
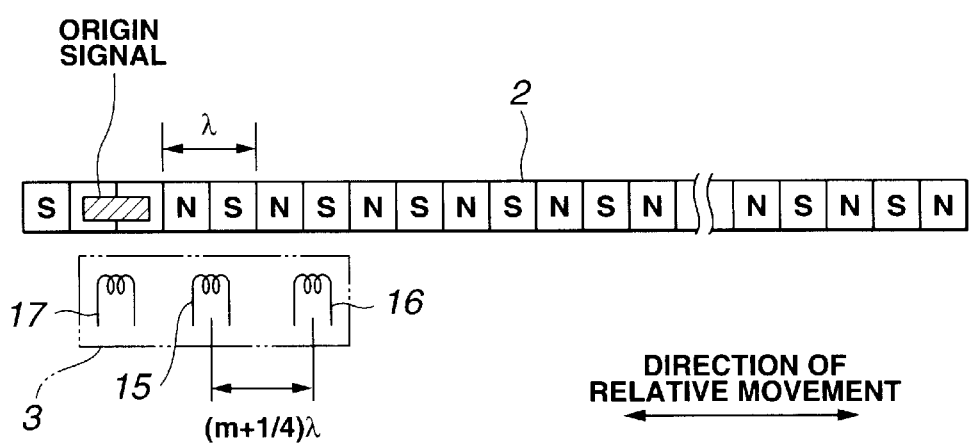
FIG. 4 is a diagram for explaining a positional relationship between the scale and a head section provided in the position detection apparatus.

The head section 3 has, as shown in FIG. 4, a first position detection head 15 and a second position detection head 16 for detecting a position signal and an origin detection head 17 for detecting an origin signal. The head section 3 having such respective heads 15, 16 and 17 is fitted to a member to which the scale 2 is not fitted, of two members that move linearly, for example, to a fixed section. As a result, the scale 2 and the head section 3 move relative to each other, as the two members move linearly. Respective heads 15, 16 and 17 are fixed to a position where the position signal or the origin signal can be detected. That is to say, these are arranged in a position, for example, facing the position signal and the origin signal, so that when the scale 2 moves linearly in the longitudinal direction, the position signal recorded on the scale 2 in the longitudinal direction can be always detected.

Moreover, the first detection head 15 and the second detection head 16 are arranged apart from each other by $(m+¼) \lambda$ in the longitudinal direction of the scale 2, that is, in the direction of the relative movement of the machine tool. λ denotes a wavelength of the position signal, and m denotes an integer. Since the position signal is a periodic signal having a wavelength λ, a signal is detected from the second position detection head 16, whose phase is shifted by ¼ wavelength with respect to the signal detected from the first position detection head 15.

Figure 5A:
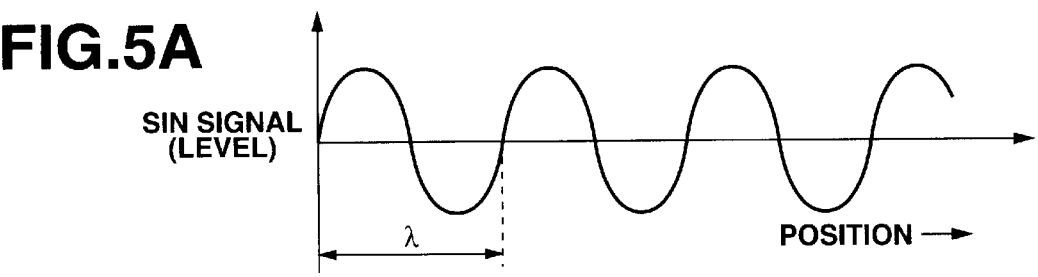
FIG. 5(A) is a diagram showing a waveform reproduced by a first position detection head of the head section, and 5(B) is a diagram showing a waveform reproduced by a second position detection head of the head section.
Figure 5B:
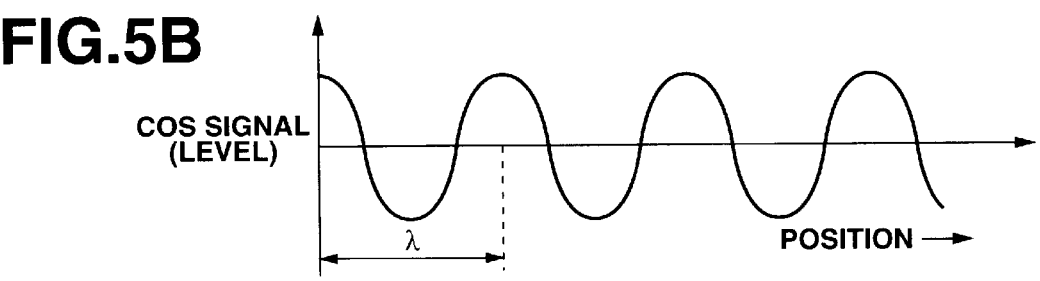

As a result, as shown in FIG. 5(A), a sinusoidal signal is detected from the first position detection head 15, which is repeated in a period λ as the machine tools move relative to each other. Also, as shown in FIG. 5(B), a signal repeated in a period λ as the machine tools move relative to each other and detected by the first position detection head 15 and a sinusoidal signal whose phase is shifted by ¼ wavelength are detected from the second position detection head 16. Here, a signal detected by the first position detection head 15 is referred to as a SIN signal, and a signal detected by the second position detection head 16 is referred to as a COS signal.

Moreover, the origin detection head 17 may have a phase shift in the position arranged with respect to the first position detection head 15 and the second position detection head 16, so long as the origin signal recorded in one place on the scale 2 in the longitudinal direction can be detected.

Such a head section 3 supplies a SIN signal to the first analog/digital conversion section 4, and a COS signal to the second analog/digital conversion section 5. In addition, the head section 3 pulses the origin signal detected by the origin detection head 17 and supplies the pulsed signal to the output pulse generation section 11.

When the position signal and the origin signal are recorded optically on the scale 2, the head 3 can detect these signals using an optical head, and output the SIN signal and COS Signal as shown in FIG. 5(A) and FIG. 5(B), and also output the origin signal.

Moreover, though the first position detection head 15 and the second position detection head 16 are arranged so as to effect a phase shift by ¼ wavelength in the detected signal, these may be arranged so as to effect the phase shift not only by ¼ wavelength but also by other phase value, since with the position detection apparatus 1, a position in one period of the position signal has only to be specified by an angle, from two signals detected by the polar conversion section 5 described later.

Furthermore, when an MR head is used as the first position detection head 15 and the second position detection head 16, the wavelength of the position signal detected by the MR head can be ½ the wavelength of the position signal recorded on the scale 2. At this time, when the MR head is used, a periodic signal having a ½ wavelength of the position signal recorded on the scale 2 is output from the first position detection head 15 and the second position detection head 16. With this apparatus, the signals output from the first position detection head 15 and the second position detection head 16 are used as the position signal in a processing described below.

(Analog/digital Conversion Section)

The first analog/digital conversion section 4 converts the SIN signal supplied from the head section 3 into digital data. Also, the second analog/digital conversion section 5 converts the COS signal supplied from the head section 3 into digital data. A sampling clock of these first analog/digital conversion section 4 and second analog/digital conversion section 5 is supplied from, for example, a clock generation apparatus (not shown). The sampling clock used for the first analog/digital conversion section 4 and the second analog/digital conversion section 5 is also supplied to the polar conversion section 6, the PLL low pass filter 7, the noise detection section 8, the filter control section 9, the response limiting section 10, and the output pulse generating section 11, described later, and is referred to as a reference clock. The sampling clock is to be a clock having a sufficiently high frequency than the time necessary for linear movement of the machine tool whose position is to be detected, by the resolution of the first analog/digital conversion section 4 and the second analog/digital conversion section 5, that is, by the quantization unit of A/D. For example, if the specification is decided such that minimum 1 $\mu$ second is required for the machine tool whose position is to be detected to move for the quantization unit of A/D, the sampling clock is to have a frequency sufficiently higher than that.

These first analog/digital conversion section 4 and second analog/digital conversion section 5 convert the SIN signal and the COS signal to, for example, 10 bit digital data, respectively, and supply the data to the polar conversion section 6. Here, signals obtained by converting the SIN signal into the digital data are hereinafter referred to as SIN data, and signals obtained by converting the COS signal into the digital data are hereinafter referred to as COS data.

(Polar Conversion Section)

The polar conversion section 6 converts the SIN data and the COS data into polar coordinates to thereby generate amplitude data and angle data showing a position of relative movement of the scale 2 and the head section 3 in one wavelength $\lambda$ of the position signal recorded on the scale 2.

Figure 6:
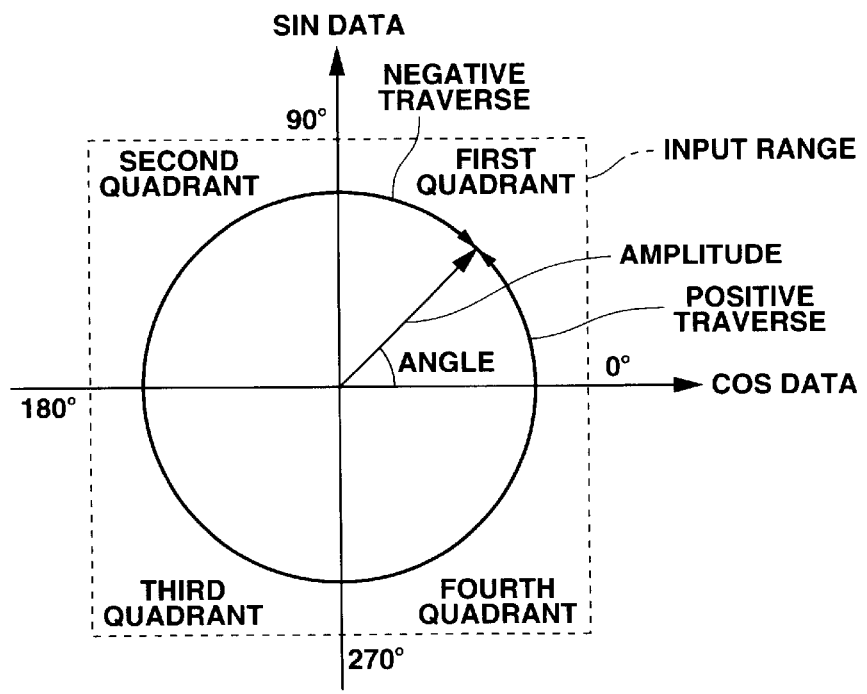
FIG. 6 is a diagram for explaining a Lissajous figure of a SIN signal and a COS signal output from the head section.

That is to say, if a vector is drawn, taking the COS data on the X-axis and the SIN data on the Y-axis, a Lissajous figure, as shown in FIG. 6, is given which rotates in the right and left direction according to the direction of relative movement of the scale 2 and the head section 3. According to the Lissajous figure, one rotation corresponds to one wavelength $\lambda$ of the position signal, and the angle shows an absolute position in one wavelength of the position signal. From this, the absolute position of the scale 2 and the head 3 in one wavelength $\lambda$ can be expressed by performing polar conversion of the SIN data and the COS data. That is to say, since the position signal recorded on the scale 2 is a periodic signal, angle data showing the position information in one period can be generated by converting the level of the periodic signal into polar coordinates.

Figure 7:
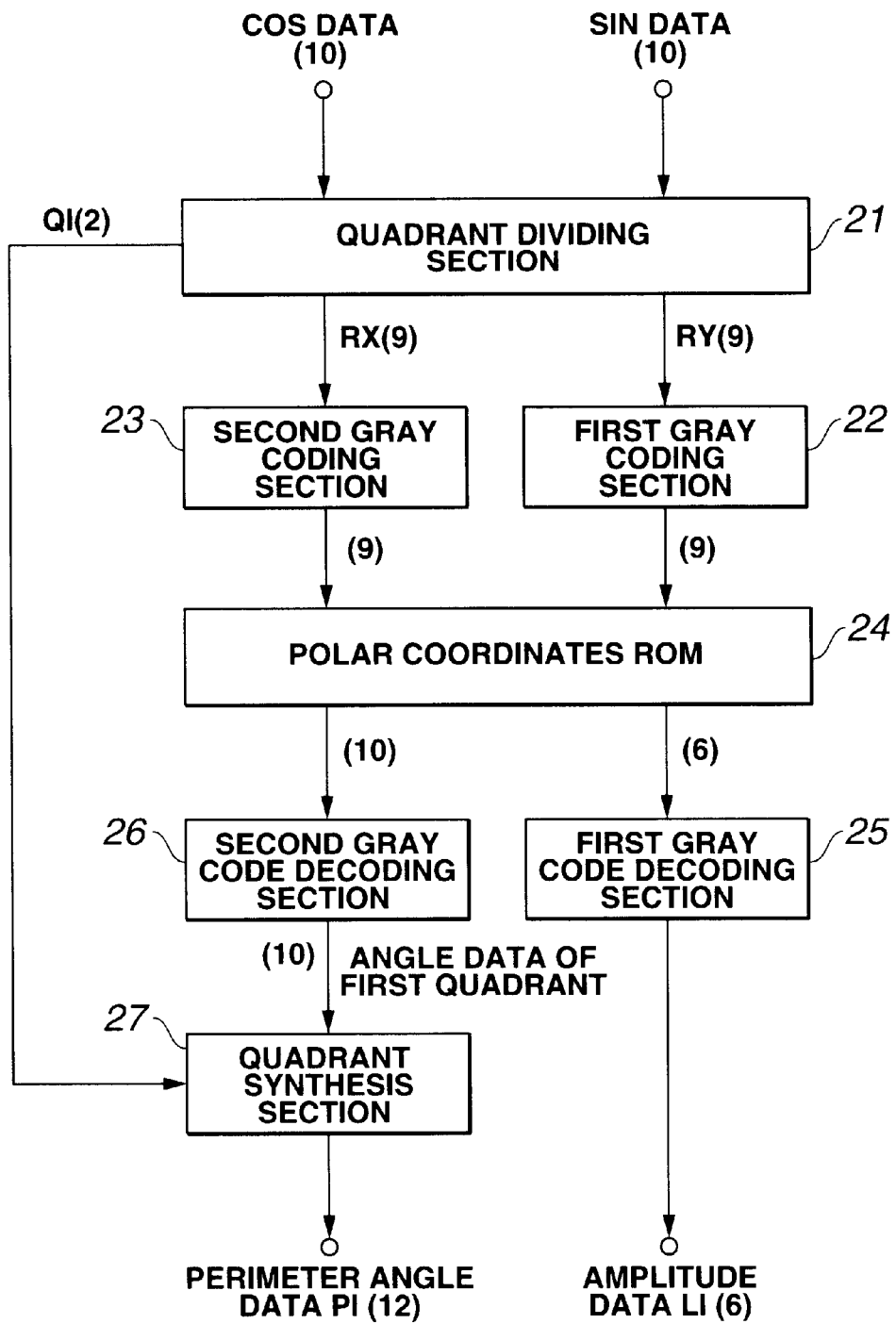
FIG. 7 is a block diagram of a polar conversion section provided in the position detection apparatus.

FIG. 7 shows a block diagram of the polar conversion section 6, and the polar conversion section 6 will now be described in more detail.

The polar conversion section 6 has a quadrant dividing section 21, a first Gray coding section 22, a second Gray coding section 23, a polar coordinates ROM 24, a first Gray code decoding section 25, a second Gray code decoding section 26, and a quadrant synthesis section 27.

The quadrant dividing section 21 is supplied with SIN data (10 bits) and COS data (10 bits). The quadrant dividing section 21 divides those SIN data and COS data into 2-bit quadrant instruction data QI generated based on positive/negative symbol (for example, symbol of the most significant bit) attached to the SIN data and COS data, 9-bit first quadrant SIN data RY obtained by converting the SIN data in each quadrant into data corresponding to the first quadrant, and 9-bit first quadrant COS data RX obtained by converting the COS data in each quadrant into data corresponding to the first quadrant. The quadrant dividing section 21 supplies the quadrant instruction data QI to the quadrant synthesis section 27, the first quadrant SIN data RY to the first Gray coding section 22 and the first quadrant COS data RX to the second Gray coding section 23.

The first Gray coding section 22 subjects the first quadrant SIN data RY to Gray coding and supplies the Gray coded data to the polar coordinates ROM 24. The second Gray coding section 23 subjects the first quadrant COS data RX to Gray coding and supplies the Gray coded data to the polar coordinates ROM 24.

The polar coordinates ROM 24 stores a polar conversion table in which the Gray-coded first quadrant SIN data RY and the Gray-coded first quadrant COS data RX are described as an address. In this polar conversion table, amplitude data LI corresponding to the Gray-coded first quadrant SIN data RY and the Gray-coded first quadrant COS data RX, and angle data PI of the first quadrant (0°–90°) are described. The amplitude data LI and the angle data PI of the first quadrant are respectively Gray-coded and stored in the polar coordinates ROM.

Figure 8:
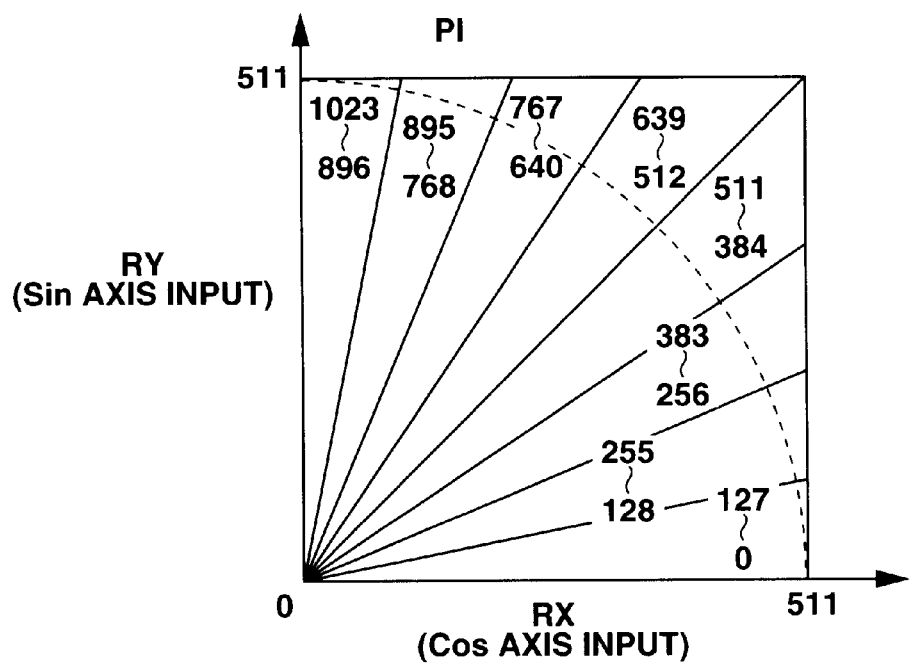
FIG. 8 is a diagram for explaining the angle data in the polar conversion table stored in a polar coordinates ROM in the polar conversion section.
Figure 9:
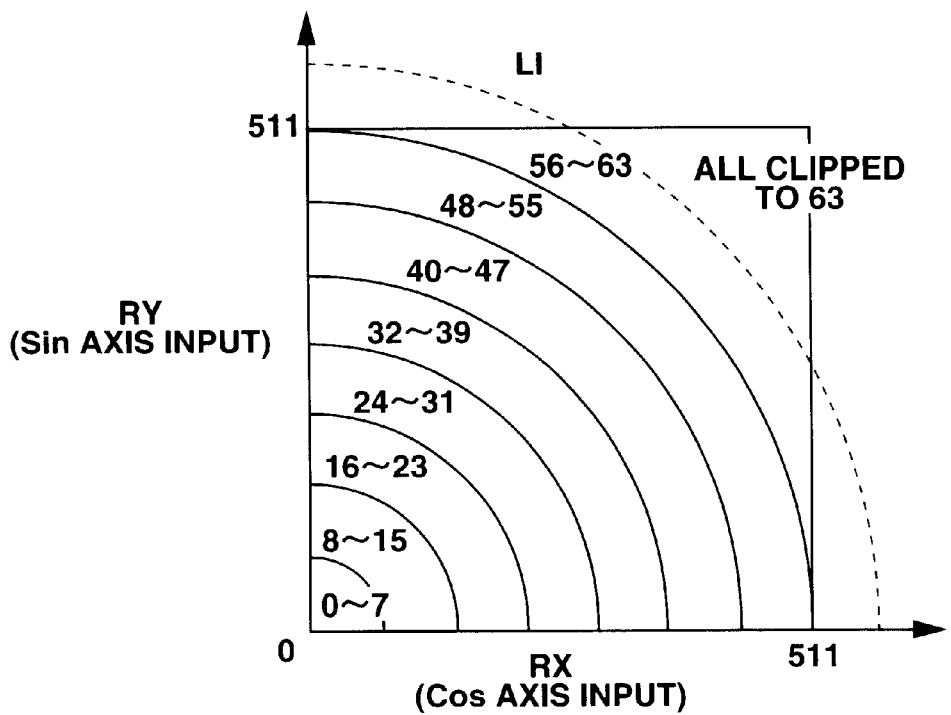
FIG. 9 is a diagram for explaining the amplitude data in the polar conversion table stored in a polar coordinates ROM in the polar conversion section.

In the polar conversion table, in total 16-bit data are stored, including 10 bits of angle data in the first quadrant and 6 bits of amplitude data. The angle data are data represented by dividing 0°–90° by 90°/1024 units, as shown in FIG. 8. Moreover, the amplitude data are, as shown in FIG. 9, data represented by dividing the amplitude at the time of the maximum amplitude on the SIN axis or the COS axis (at the time of SIN data=511 and COS data=0, or at the time of SIN data=0 and COS data=511) by 56. Since the amplitude data are 6 bits, it is possible to express the data from 0 to 63. However, since there may be a case where the detected measurement value is larger than a theoretical value due to noise or distortion, a margin is provided in the expression range, taking into consideration the case where the measurement value is larger than a theoretical value. If the measured amplitude value exceeds 63, all values exceeding 63 are clipped to 63.

The polar coordinates ROM 24 refers to the polar conversion table to perform polar conversion, and outputs the angle data and the amplitude data Gray-coded corresponding to the first quadrant SIN data RY and the first quadrant COS data RX. The polar coordinates ROM 24 supplies the amplitude data to the first Gray code decoding section 25, and supplies the angle data to the second Gray code decoding section 26.

The first Gray code decoding section 25 decodes the Gray code of the amplitude data LI supplied from the polar coordinates ROM 24, and converts the amplitude data to the amplitude data having normal codes. The second Gray code decoding section 26 decodes the Gray code of the angle data PI of the first quadrant supplied from the polar coordinates ROM 24, and converts the angle data to the first quadrant angle data having normal codes.

Here, the conversion function from the first quadrant SIN data RY and the first quadrant COS data RX to the amplitude data LI and the first quadrant angle data PI, that is, a function including the polar coordinates ROM 24 and the Gray code conversion before and after thereof is as follows:

$$PI=\tan^{-1}\{RY/RX\}*1024/90$$

$$LI=56[(\sqrt{\{(RY/511)^2+(RX/511)^2\}}]$$ provided that all values exceeding 63 are clipped to 63.

The quadrant synthesis section 27 adds quadrant instruction data QI generated in the quadrant dividing section 21 as the upper bit of the 10-bit first quadrant angle data PI to give angle data of the perimeter having 12 bits in total.

In this manner, the polar conversion section 6 performs polar conversion of the SIN data and the COS data, to thereby generate 12-bit angle data PI of the perimeter (0°–360°) and 6-bit amplitude data LI. The perimeter angle data PI generated by the polar conversion section 6 are supplied to the PLL low pass filter 7, and the amplitude data LI are supplied to the noise detection section 8.

As described above, with the polar conversion section 6, the polar coordinates ROM 24 only stores the polar conversion table corresponding to the first quadrant, hence reducing the capacity, without storing all data for four quadrants.

Furthermore, the polar coordinates ROM 24 stores the first quadrant SIN data, the first quadrant COS data, and the angle data and amplitude data to be output by encoding these data to Gray codes. Here, the SIN data and the COS data that are position information acquired from the scale 2, and the angle data and the amplitude data obtained by subjecting these SIN data and COS data to the polar conversion have sufficiently high A/D sampling frequency. Hence, these data are always continuously converted as the scale 2 and the head section 3 move relative to each other, excluding when noise occurs. Accordingly, by adopting Gray code in which there is only one bit change between adjacent codes, bit change on the bus line can be reduced and spike noise can be greatly suppressed at the time of memory access, thereby preventing deterioration in precision resulting from the noise. For example, spike noise can be reduced to ½ in average, compared to a case where these data are not encoded to Gray codes, and further reduced to a fraction of one bit at a position where the maximum bit change occurs.

(PLL Low Pass Filter)

The PLL low pass filter 7 performs low pass filtering processing for removing high pass frequency components with respect to the angle data PI converted by the polar conversion section 6. The PLL low pass filter 7 determines the phase error in input and output, and controls so that the phase error is 0 to thereby perform filtering. That is to say, the PLL low pass filter 7 has a similar circuit construction to that of the PLL (Phase Locked Loop).

Figure 10:
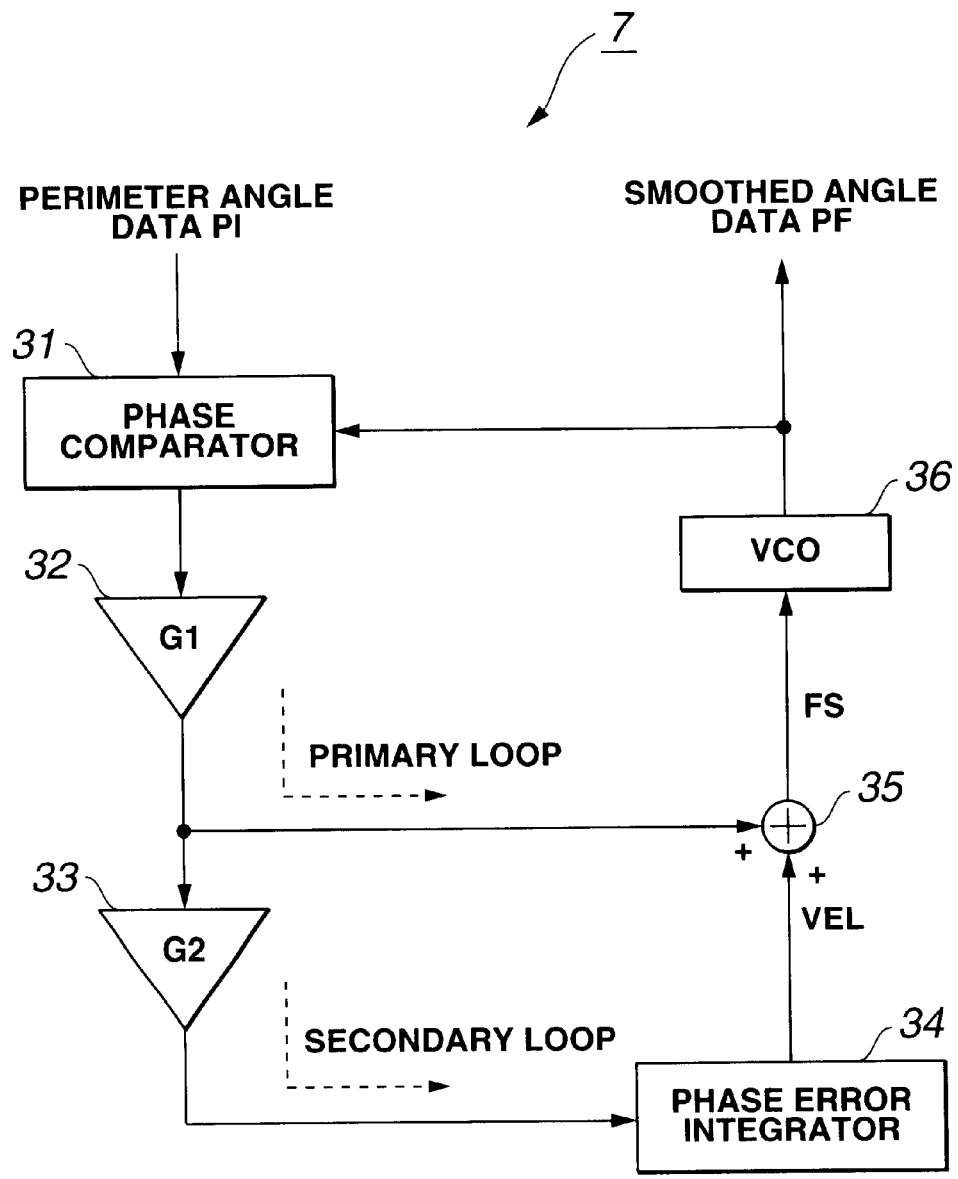
FIG. 10 is a block diagram of a PLL low pass filter provided in the position detection apparatus.

The construction of such a PLL low pass filter 7 is shown in FIG. 10, and the principle of operation will now be described below.

The PLL low pass filter 7 has, as shown in FIG. 10, a phase comparator 31, a first amplifier 32, a second amplifier 33, a phase error integrator 34, an adder 35 and a VCO (Voltage Controlled Oscillator) 36.

With the PLL low pass filter 7, the angle data PI in the range of perimeter (0° to 360°) generated by the polar conversion section 6 is input, and smoothed angle data PF obtained by smoothing the angle data PI is output.

The perimeter angle data PI is input to the phase comparator 31, as well as the smoothed angle data PF to be output being fed back and input. The phase comparator 31 determines the phase error between the angle data PI and the smoothed angle data PF to thereby generate a phase error signal PE. The phase comparator 31 supplies the generated phase error signal PE to the first amplifier 32.

The first amplifier 32 amplifies the phase error signal PE with a predetermined gain ($G_1$), and supplies the amplified phase error signal PE to the second amplifier 33 and the adder 35.

The second amplifier 33 further amplifies the phase error signal PE amplified by the first amplifier 32 with a predetermined gain ($G_2$), and supplies the amplified phase error signal PE to the phase error integrator 34.

When the PLL low pass filter 7 is formed of a digital circuit, the above-described first amplifier 32 and the second amplifier 33 are formed of a multiplier.

The phase error integrator 34 performs integral calculus with respect to the phase error signal PE to smooth the signal, and generates a velocity error signal VEL. The phase error integrator 34 supplies the generated velocity error signal VEL to the adder 35.

The adder 35 adds the phase error signal PE supplied from the first amplifier 32 and the velocity error signal VEL supplied from the phase error integrator 34, to thereby generate a frequency control voltage signal FS. The adder 35 supplies the generated frequency control voltage signal FS to the VCO 36.

The VCO 36 outputs the frequency data in which the frequency is controlled so that the frequency control voltage signal FS is 0 as the smoothed angle data PF. That is to say, the VCO 36 outputs a frequency signal in which the phase error signal PE and the velocity error signal VEL obtained by integrating the phase error signal PE become 0. The VCO 36 is a voltage control oscillator which generates a periodic signal such that the frequency and the phase coincide with the input signal. The VCO 36 is a voltage control oscillator which operates, designating the frequency 0 of the output signal as a central frequency.

With the PLL low pass filter 7 having such a construction, a loop filter is formed from a primary loop for supplying the phase error signal PE from the first amplifier 32 via the adder 35 to the VCO 36 and a secondary loop for supplying the velocity error signal VEL obtained by integrating the phase error signal PE to the VCO 36 via the adder 35, to thereby lock the frequency and the phase of the input signal and the output signal.

Figure 11:
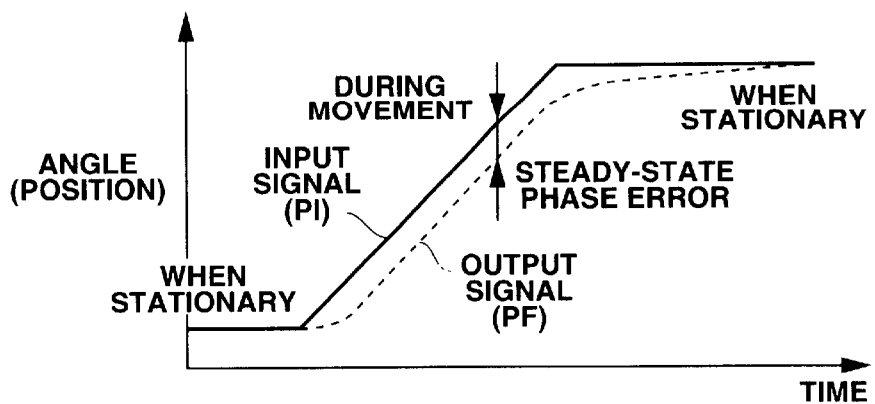
FIG. 11 is a diagram for explaining a steady-state phase error occurring when filtering is performed only with a primary loop of the PLL low pass filter.
Figure 12:
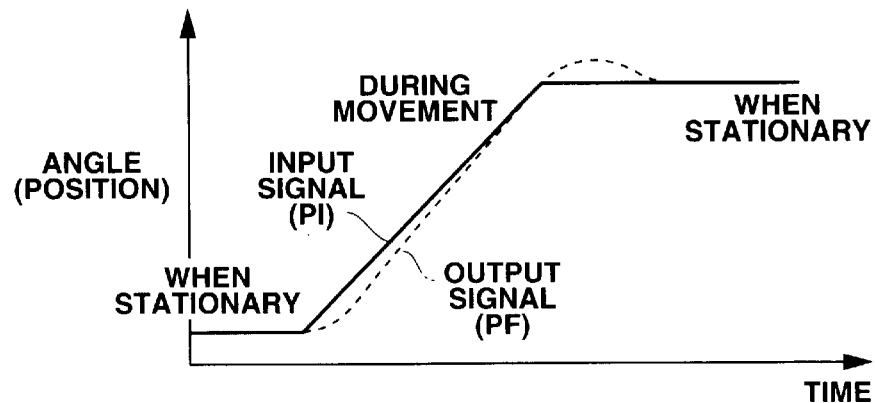
FIG. 12 is a diagram for explaining a response characteristic when a secondary loop is added in the PLL low pass filter.

With the primary loop, a negative feedback control is performed so that the phase error is 0. However, when the angle data PI is changing at the steady state speed, that is, the machine tool is moving at a steady state speed, as shown in FIG. 11, a phase error in proportion to the speed occurs, when using only the primary loop. Therefore, with the PLL low pass filter 7, a secondary loop is provided to generate the velocity error signal VEL by integrating the phase error PE, and to perform the negative feedback control so that the phase error is 0. With the PLL low pass filter 7, as shown in FIG. 12, the smoothed angle data PF being the output signal traces on average the angle data PI being the input signal by means of the primary loop and the secondary loop, to give the low pass filter output of the angle data PI.

Moreover, if the gain of the first amplifier 32 is changed, the feedback gain of the primary loop can be controlled, and if the gain of the second amplifier 33 is changed, the feedback gain of the secondary loop can be controlled. By changing the feedback gain, the cut-off frequency of the low pass filter can be changed.

Figure 13:
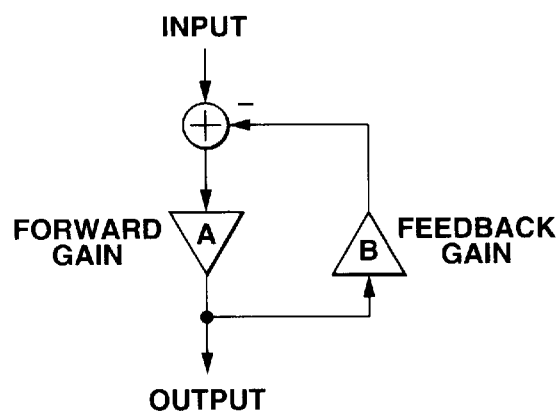
FIG 13 is a block diagram for explaining a closed loop response characteristic of a general feedback system.

Normally, the closed loop response characteristic Gc of the feedback system has a circuit construction as shown in FIG. 13, and if it is assumed that A is a forward gain and B is a feedback gain, it can be expressed as:

$Gc=A/(1+AB)$.

Figure 14:
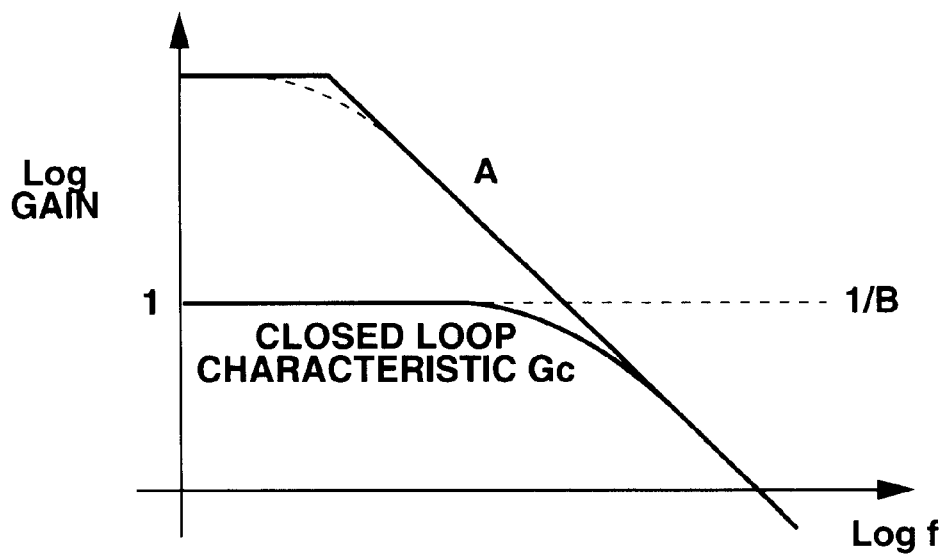
FIG. 14 is a board diagram for explaining the above-described closed loop response characteristic of a general feedback system.

The response characteristic at this time is as shown in FIG. 14, if it is assumed that, for example, $A=1/(1+S)$ and $B=a$ fixed number. Here, S denotes a Laplacian operator.

Here, if the noise suppression characteristic of the PLL low pass filter 7 is applied to the closed loop response characteristic Gc of the feedback system, following expressions are given:

$A=G_1(1+G_2/S)/S$ $B=1$.

Figure 15:
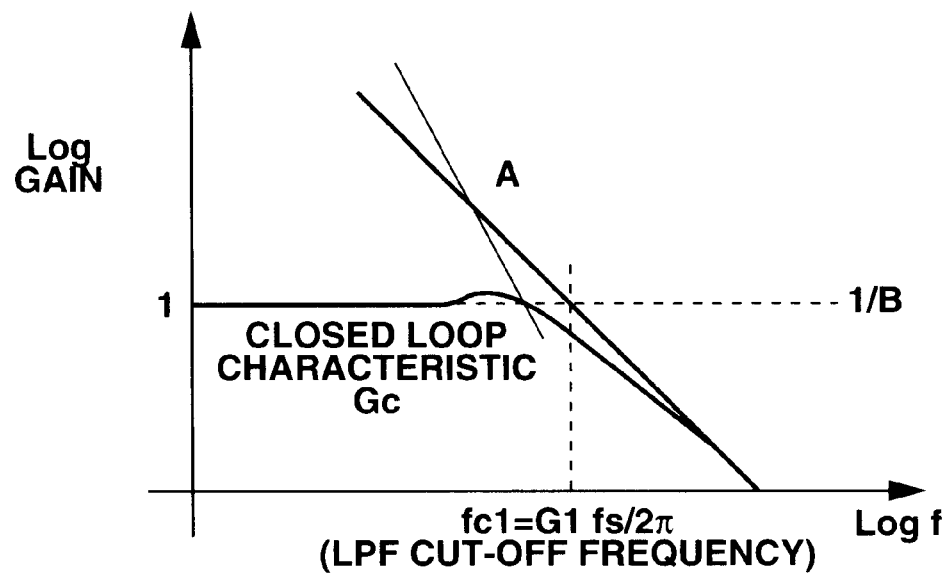
FIG. 15 is a board diagram for explaining a noise suppression characteristic of the PLL low pass filter.

Here, $G_1$ denotes a gain of the first amplifier 32, and $G_2$ denotes a gain of the second amplifier 33. Accordingly, the noise suppression characteristic of the PLL low pass filter 7 has a characteristic as shown in FIG. 15, wherein the cut-off frequency is $fc_1=G_1 fs/2\pi$. Therefore, the PLL low pass filter 7 can obtain low pass filter characteristics that follow the angle data PI in the low frequency domain lower than the cut-off frequency $fc_1$, but does not follow noise in the high frequency domain higher than the cut-off frequency $fc_1$.

Moreover, if a residual phase error characteristic with respect to the angle change of the PLL low pass filter 7 is applied to the closed loop response characteristic Gc of the feedback system, following expressions are given:

$A=1$ $B=G_1(1+G_2/S)/S$.

Figure 16:
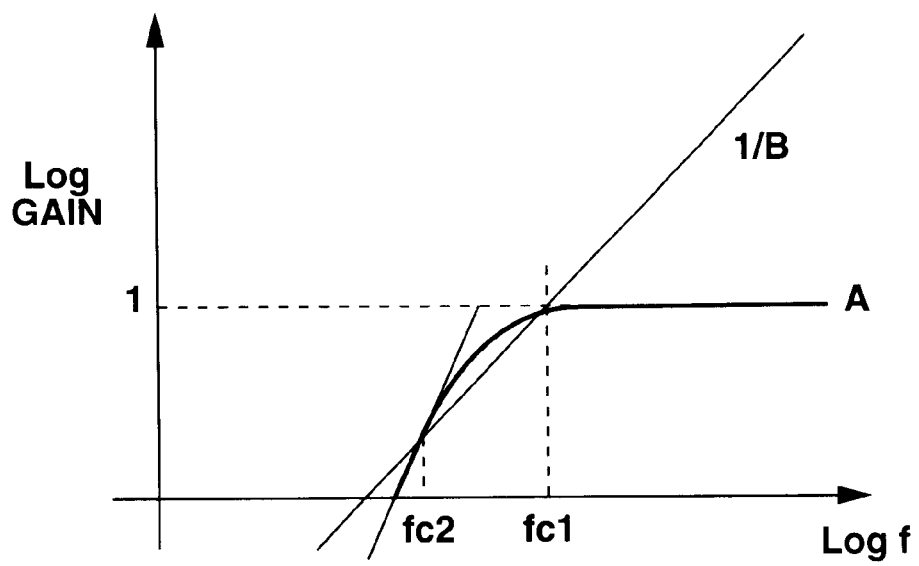
FIG. 16 is a board diagram for explaining a residual phase error characteristic with respect to an angle change in the PLL low pass filter.

Accordingly, the residual phase error characteristic with respect to the angle change of the PLL low pass filter 7 is a characteristic as shown in FIG. 16. Therefore, the PLL low pass filter 7 can obtain characteristics wherein the angle change in the angle data PI is directly output in the high frequency domain higher than the cut-off frequency $fc_1$, but the angle change is damped in the low frequency domain lower than the cut-off frequency $fc_1$, to thereby follow a change in the angle data PI to be input with high precision.

Figure 17:
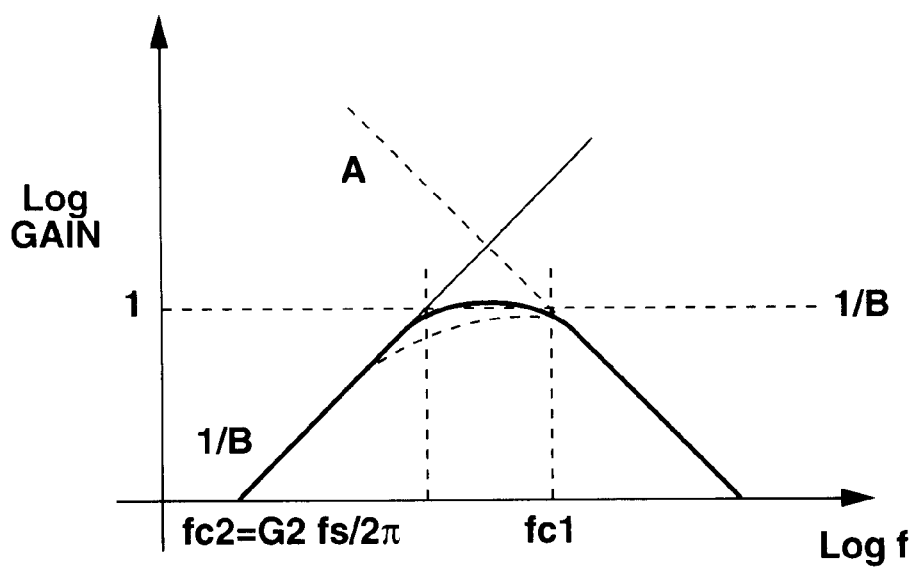
FIG. 17 is a board diagram for explaining a residual phase error characteristic with respect to a speed change in the PLL low pass filter.

Furthermore, let us consider the residual phase error characteristic with respect to the velocity change of the PLL low pass filter 7. In this case, since the angle change is an integral of the velocity change, the residual phase error characteristic with respect to the velocity change of the PLL low pass filter 7 is a characteristic as shown in FIG. 17 that is obtained by integrating the graph shown in FIG. 16. As shown in FIG. 17, the residual phase error characteristic with respect to the velocity change is such that the angle change due to the velocity change is originally small in the high frequency domain, and the residual error is small in the low frequency domain due to the feedback, and in particular, in the DC region, the residual error is 0. As a result, with the PLL low pass filter 7, the residual error is 0 during movement at a steady-state velocity, including the stationary condition.

Figure 18:
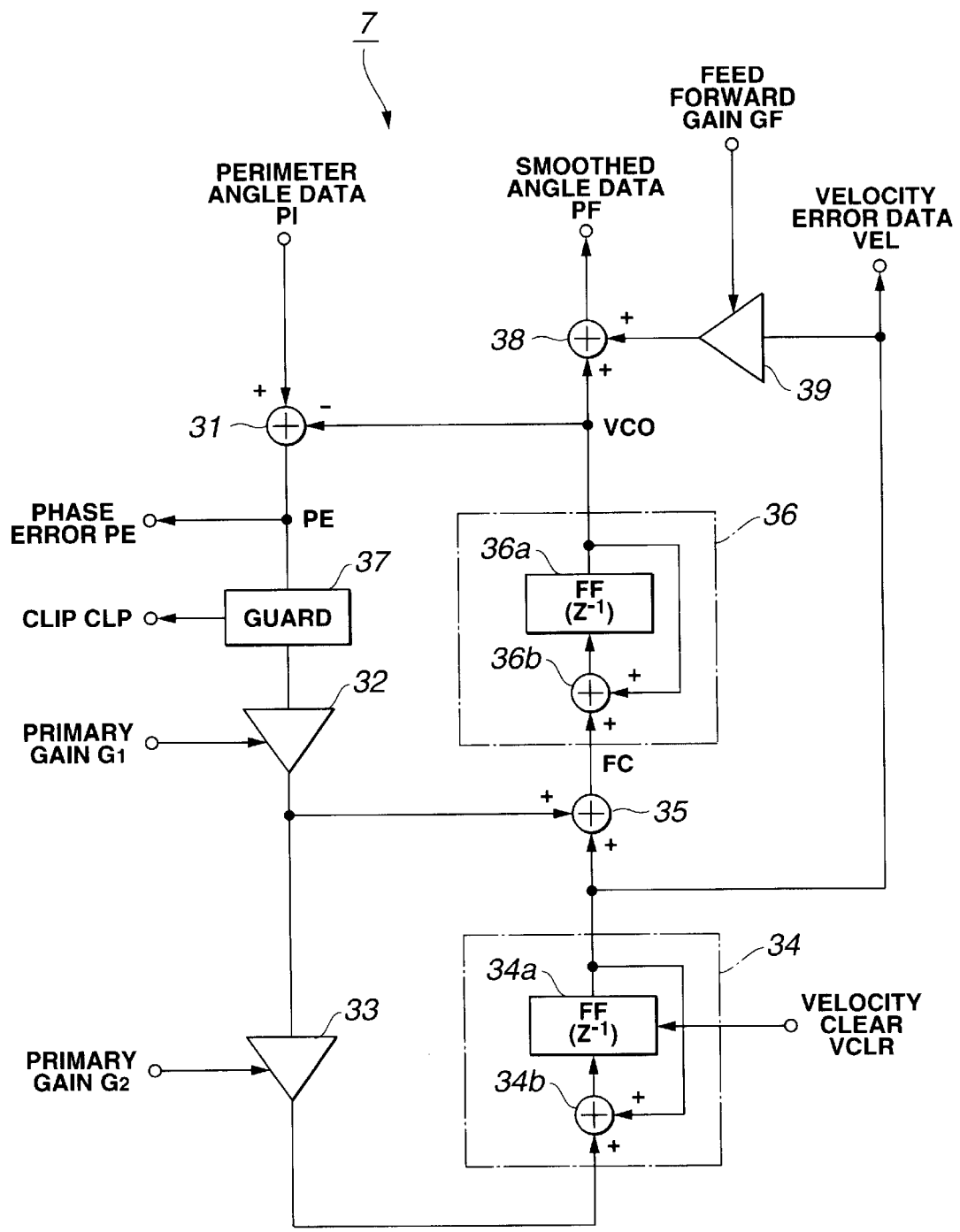
FIG. 18 is a circuit diagram of the PLL low pass filter comprising a digital circuit.

With this PLL low pass filter 7, the whole processing is performed using digital data. Hence, with this apparatus, the PLL low pass filter comprising a digital circuit as shown in FIG. 18 is used.

Now, the PLL low pass filter 7 constituted of a digital circuit will be described below. Here, with the PLL low pass filter comprising a digital circuit, the above-described phase error signal PE is designated as the phase error data PE being digital data, and the velocity error signal VEL is the velocity error data VEL.

If the PLL low pass filter comprises a digital circuit, the phase comparator 31 is constituted of a subtraction circuit. Moreover, the phase error integrator 34 comprises an accumulator (cumulative adder) comprising a flip flop circuit 34a and an adder 34b. Also the VCO 36 comprises an accumulator comprising a flip flop circuit 36a and an adder 36b, and outputs the smoothed angle data PF by cumulatively adding the frequency control code FC instead of the frequency control voltage signal FS.

The values of the primary gain $G_1$, of the first amplifier 32 and the secondary gain $G_2$ of the second amplifier 33 are controlled by the filter control section 9 described later.

The flip flop circuit 34a of the phase error integrator 34 and the flip flop circuit 36a of the VCO 36 both operate according to a sampling clock ($Z^{-1}$) of the first analog/digital conversion section 4 and the second analog/digital conversion section 5. Accordingly, the phase error integrator 34 and the VCO 36 cumulatively add the data for each sample of the first analog/digital conversion section 4 or the like.

Moreover, the PLL low pass filter 7 comprising a digital circuit has a guard circuit 37 provided between the phase comparator 31 and the first amplifier 32. The guard circuit 37 clips the phase error to ±45°, if the phase error date PE is higher than ±50°, and outputs a phase error over signal CLP, in order that the filter control section 9 described later controls the gain of the first amplifier 32 and the second amplifier 33.

Furthermore, the PLL low pass filter 7 comprising a digital circuit has an adder 38 disposed between an output terminal of the smoothed angle data PF and the VCO 36, and a third amplifier 39 for amplifying the velocity error data VEL. The third amplifier 39 amplifies the velocity error data VEL with a predetermined gain, and supplies the amplified velocity error data VEL to the adder 38. The adder 38 adds the output data VCO output from the VCO 36 and the velocity error data VEL amplified with a predetermined gain and supplied from the third amplifier 39. Thus, by adding the velocity error component to the output data, output data can be obtained wherein a delayed portion occurring from the output of the VCO 36 to the final output (in this apparatus, the output from the output pulse generation section 11) is corrected. The output data VCO of the VCO 36 before the velocity error data is added is fed back to the phase comparator 31. The third amplifier 39 comprises a digital circuit, hence it comprises a multiplier, as with the first amplifier 32 and the second amplifier 33.

The PLL low pass filter 7 as described above supplies the smoothed angle data PF obtained by filtering the input angle data PI to the response limiting section 10. Moreover, the PLL low pass filter 7 supplies the phase error data PE generated during filtering processing to the noise detection section 8, and supplies the clip signal CLP to the filter control section 9.

Furthermore, with the PLL low pass filter 7, the gain (primary gain $G_1$) of the first amplifier 32, the gain (secondary gain $G_2$) of the second amplifier 33 and the gain (feedback gain $G_F$) of the third amplifier 39 are controlled by the filter control section 9. The velocity clear signal VCLR is also supplied from the filter control section 9 to the flip flop 34a of the phase error integrator 34. When the velocity clear signal VCLR is supplied, the flip flop 34a clears the data stored therein.

Figure 19A:
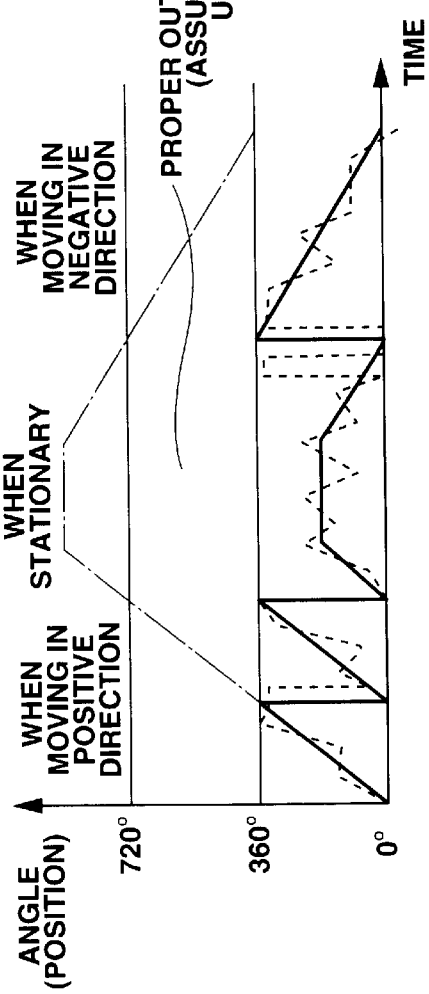
FIG. 19(A) is a diagram for explaining an input/output characteristic of the PLL low pass filter.
Figure 19B:
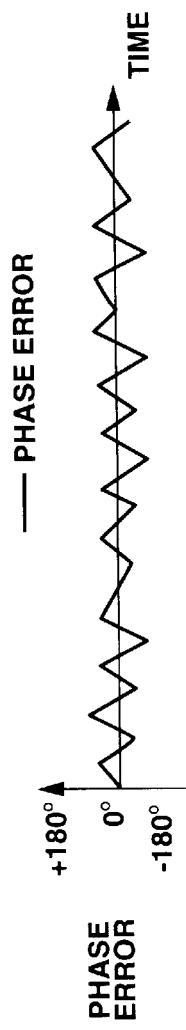
FIG. 19(B) is a diagram for explaining a phase error occurring in the PLL low pass filter.

The PLL low pass filter 7 as described above has a PLL type IIR (Infinite Impulse Response) construction which determines the phase error in the input and output and locks between the input and output so that the phase error is 0. Hence, low pass filtering can be performed with respect to the modulo-phase angle data which repeats the angle range of from 0° to 360° over many periods. That is to say, even if it is repeated over many periods, the phase error changes only within ±180°, and since filtering is performed with respect to the phase error, the angle data can be smoothed. For example, since phase error data PE within ±180° as shown in FIG. 19(B) which occurs with respect to the angle data PI repeated in the angle range of from 0° to 360° as shown in FIG. 19(A) is made zero, the smoothed angle data PF in which a saw tooth waveform is smoothed without weakening can be output. Moreover, since the position detection apparatus 1 can perform filtering after the polar conversion, by using the PLL low pass filter 7, the filtering circuit can be made one system, thereby enabling reduction in circuit size.

Generally, in order to improve the filtering precision, the cut-off frequency of the low pass filter must be reduced to $1/n^2$. For example, in order to reduce the cut-off frequency to $1/n^2$ with the low pass filter comprising an FIR (Finite Impulse Response) filter, it is necessary to increase the number of taps to $n^2$ times, thereby increasing the circuit size. However, since the PLL low pass filter 7 has an IIR construction, the cut-off frequency can be reduced to $1/n_2$, only by increasing the number of bit by 2n bits in the primary gain, and by 4n bits in the secondary gain. Hence, the precision can be improved only by slight increase in circuit size.

Also, the PLL low pass filter 7 can change the precision and the cut-off frequency only by changing the feedback gain, and even if the feedback gain is changed discontinuously, the output thereof is not discontinuous. Hence, adaptive control can be easily performed, based on the situation of the input/output, situation of the phase error, external information or the like.

Moreover, by using the PLL low pass filter 7, the polar conversion is performed followed by filtering, As a result, not only output noise of the head section 3 and quantize noise at the time of A/D conversion, but also quantize noise in the polar conversion table of the polar conversion section 6 can be removed, thereby enabling increase in precision and reduction in the size of the polar conversion table. Also, since the fluctuation due to the quantize error decreases, the maximum allowable speed is improved.

Furthermore, since the influence of the quantize noise in the polar conversion table is removed, data dropoff does not occur, and even if a big external noise occurs, the error is of temporary nature unless the lock of PLL is unlocked, hence error does not accumulate.

(Noise Detection Section)

The noise detection section 8 performs detection processing to determine whether any noise is contained or not in the angle data PI input to the PLL low pass filter 7, based on the amplitude data LI supplied from the polar conversion section 6 and the phase error data PE supplied from the PLL low pass filter 7.

Figure 20:
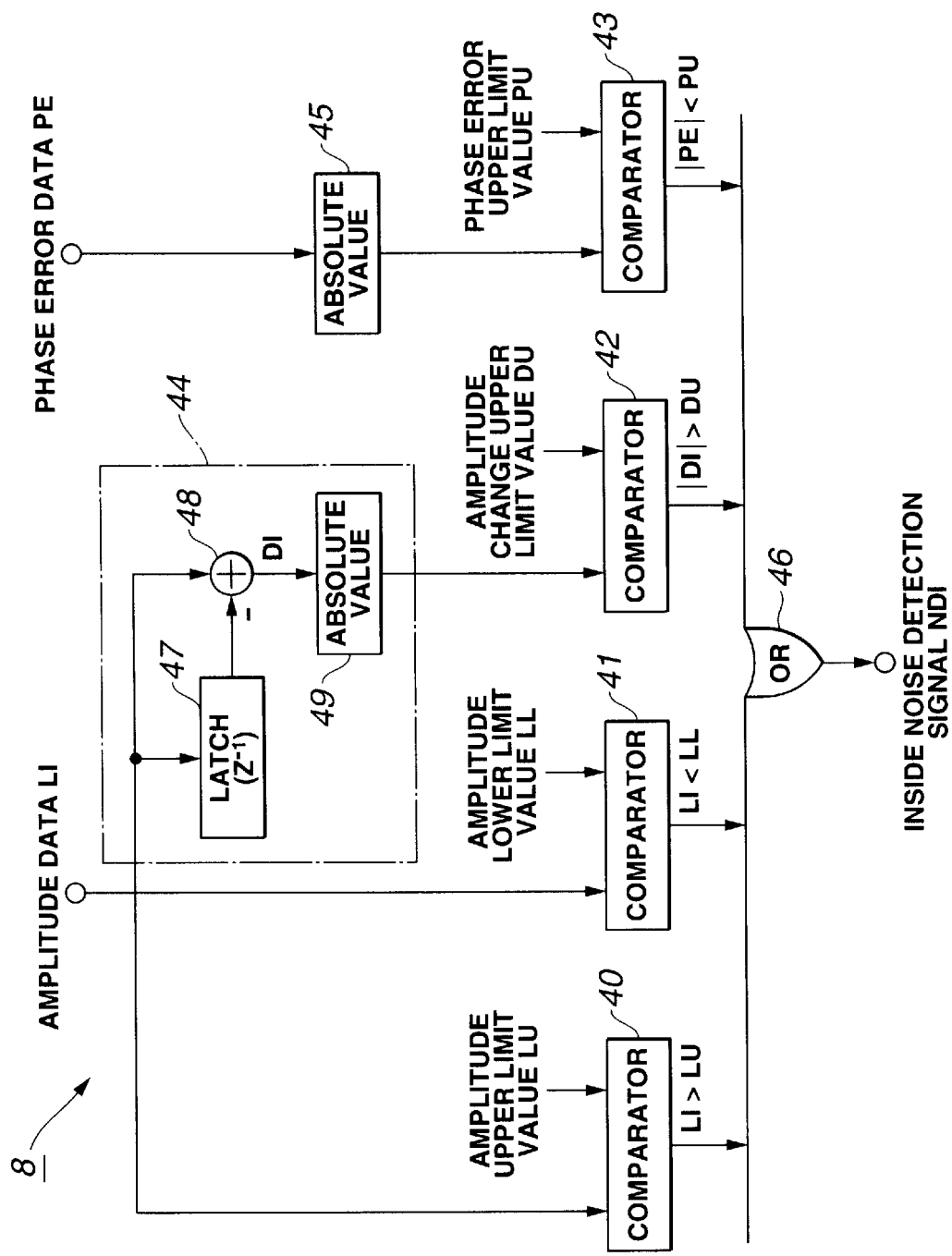
FIG. 20 is a block diagram of a noise detection section provided in the position detection apparatus.

The noise detection section 8 comprises, as shown in FIG. 20, first to fourth comparators 40, 41, 42 and 43, a variation detection circuit 44, an absolute value conversion circuit 45, and an OR circuit 46.

The amplitude data LI and the amplitude upper limit value LU are input to the first comparator 40. The first comparator 40 supplies an ON signal to the OR circuit 46, when the amplitude data LI is larger than the amplitude upper limit value LU (LI>LU).

The amplitude data LI and the amplitude lower limit value LL are input to the second comparator 41. The second comparator 41 supplies an ON signal to the OR circuit 46, when the amplitude data LI is smaller than the amplitude lower limit value LL (LI<LL).

An absolute value of the variation data output from the variation detection circuit 44 and the amplitude change upper limit value DU are input to the third comparator 42. The variation detection circuit 44 comprises a latch circuit 47 for latching the amplitude data LI for one sample, a subtractor 48 for subtracting data latched by the latch circuit 47 from the amplitude data LI, and an absolute value conversion circuit 49 for converting the output data from the subtractor 48 to an absolute value. The latch circuit 47 operates with a sampling clock of the first analog/digital conversion section 4 and the second analog/digital conversion section 5. Such a variation detection circuit 44 detects a variation from data one clock before of the input amplitude data LI, to determine the variation data DI of the amplitude data LI, and outputs an absolute value of the variation data DI. The third comparator 42 supplies an ON signal to the OR circuit 46, when the absolute value of the variation data DI is larger than the amplitude change upper limit value DU (|DI|>DU).

To the fourth comparator 43 are input the phase error data PE which is converted to an absolute value by the absolute value conversion circuit 45 and the phase error upper limit value PU. The fourth comparator 43 supplies an ON signal to the OR circuit 46, when the absolute value of the phase error data PE is larger than the phase error upper limit value PU (|PE|>PU).

The OR circuit 46 outputs an inside noise detection signal NDI, when the ON signal is supplied from any of the first to the fourth comparators 40 to 43.

The noise detection section 8 supplies the inside noise detection signal NDI output from the OR circuit 46 to the filter control section 9.

The noise detection section 8 having such a construction judges if the amplitude data LI generated together with the angle data PI at the time of polar conversion is an input larger than a predetermined value, or an input smaller than a predetermined value, or the variation is too large than a predetermined value, to thereby determine whether the angle data PI is noise or not. Also, the noise detection section 8 judges whether the phase error PE of the angle data PI exceeds a certain range or not, and if the phase error PE is outside the range, it is judged as noise.

(Filter Control Section 9)

The filter control section 9 controls initialization, suppression of external noise, increase of cutoff frequency at the time of a great acceleration, decrease of cutoff frequency at a stationary state, and link processing of the gain.

Figure 21:
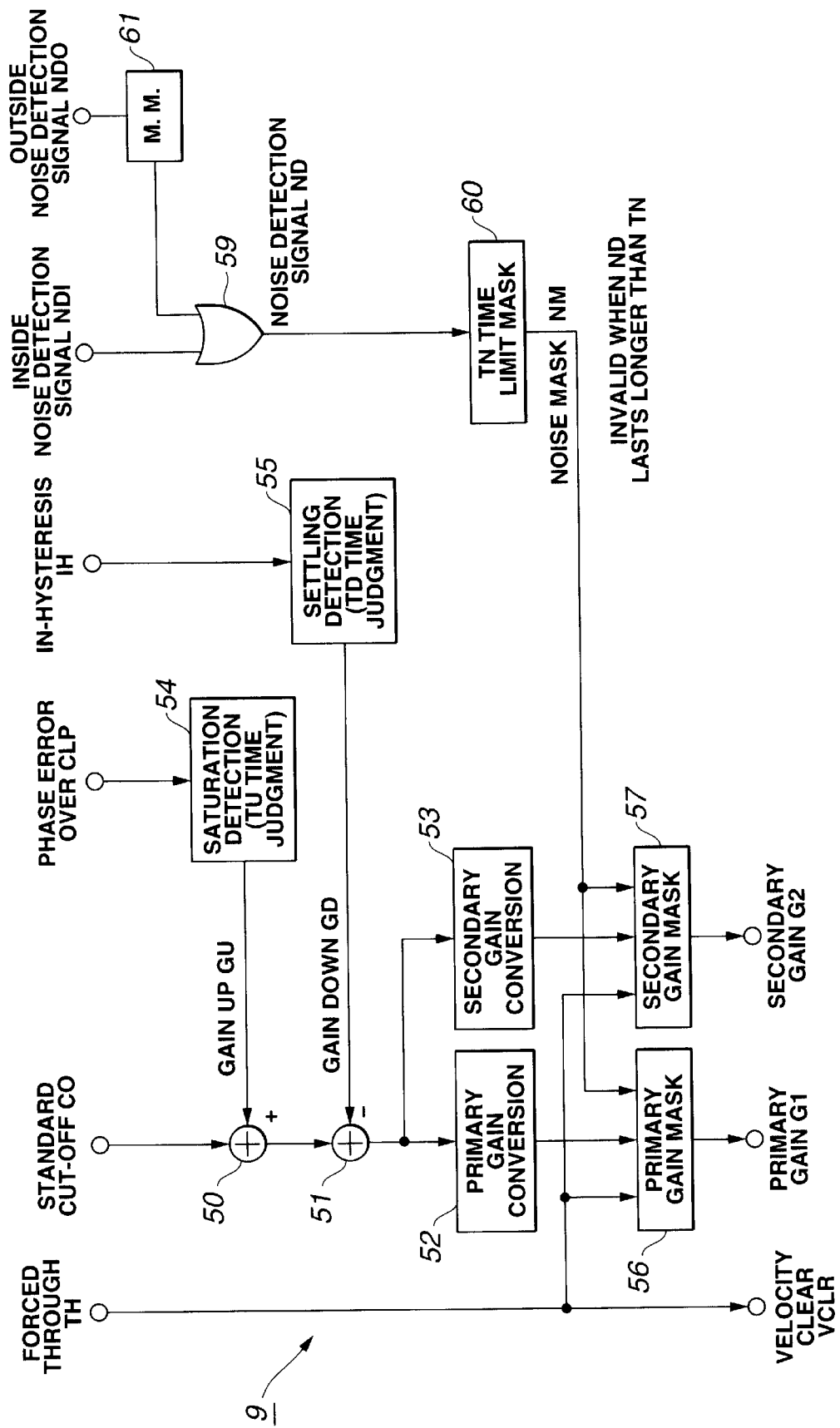
FIG. 21 is a block diagram of a filter control section provided in the position detection apparatus.

To the filter control section 9 are input, as shown in FIG. 21, a standard cut-off signal CO which decides the loop gain of the PLL low pass filter 7, a forced-through signal TH which is supplied at the time of power-on or at the time of initiating a re-measurement operation, a phase error over signal CLP supplied from the PLL low pass filter 7, an in-hysteresis signal IH fed back from the response limiting section 10 described later, an inside noise detection signal NDI generated by the noise detection section 8, and a signal obtained by passing an outside noise signal NDO supplied from outside the apparatus through a retriggerable monomulti-vibrator for the affected time.

The filter control section 9 has a gain adder 50, a gain subtractor 51, a primary gain conversion section 52, a secondary gain conversion section 53, a saturation detection section 54, a settling detection section 55, a primary gain mask section 56, a secondary gain mask section 57, an OR circuit 59, a TN time limit mask section 60 and a retriggerable monomulti-vibrator 61.

The standard cut-off signal CO is a set value of a standard cut-off frequency of the primary loop and the secondary loop of the PLL low pass filter 7, and supplied from a controller or the like (not shown). The standard cut-off signal CO is supplied to the primary gain conversion section 52 and the secondary gain conversion section 53 via the gain adder 50 and the gain subtractor 51.

The phase error over signal CLP supplied from the PLL low pass filter 7 is supplied to the saturation detection section 54. The phase error over signal CLP is a signal supplied from the guard circuit 37 of the PLL low pass filter 7, and supplied to the saturation detection section 54, when the phase error data PE exceeds ±145°. When the phase error over signal CLP is detected continuously for a predetermined time (TU time), the saturation detection section 54 outputs a gain-up signal GU, until the phase error over signal CLP is not further detected. The gain-up signal GU is supplied to the gain adder 50. The gain adder 50 adds the gain-up signal GU to the standard cut-off signal CO.

The in-hysteresis signal IH fed back from the response limiting section 10 described later is supplied to the settling detection section 55. The in-hysteresis signal IH is a signal showing that the response is limited because the variation in the smoothed angle data PF output from the PLL low pass filter 7 is minute, and there is no change occurred in the output data, that is, a signal showing a condition that the scale 2 and the head section 3 are regarded as not moving relative to each other. When this in-hysteresis signal IH is detected continuously for a predetermined time (TD time), the settling detection section 55 outputs a gain-down signal GD until the in-hysteresis signal IH is not further detected. The gain-down signal GD is supplied to the gain subtractor 51. The gain subtractor 51 subtracts the gain-down signal GD from the standard cut-off signal CO.

The first gain conversion section 52 determines by calculation the first gain $G_1$ to be supplied to the first amplifier 32 of the PLL low pass filter 7 based on a signal supplied from the gain subtractor 51. The first gain conversion section 52 determines the first gain $G_1$ by calculating the following equation:

$$G_1 = f_1(CO + GU - GD)$$

wherein $f_1(x)$ is an exponential function, which is a function that doubles every time x increments by 1.

The second gain conversion section 53 determines by calculation the second gain $G_2$ to be supplied to the second amplifier 33 of the PLL low pass filter 7 based on a signal supplied from the gain subtractor 51. The second gain conversion section 53 determines the second gain $G_2$ by calculating the following equation:

$$G_2 = f_2(CO + GU - GD)$$

wherein $f_2(x)$ is an exponential function, which is a function that doubles every time x increments by 1.

As described above, the feedback gain of the primary loop and the feedback gain of the secondary loop of the PLL low pass filter 7 are linked and set, based on the standard cut-off signal or the like.

The primary gain $G_1$ output from the primary gain conversion section 52 is supplied to the first amplifier 32 of the PLL low pass filter 7 via the primary gain mask section 56. Also, the secondary gain $G_2$ output from the secondary gain conversion section 53 is supplied to the second amplifier 33 of the PLL low pass filter 7 via the secondary gain mask section 57.

To the OR circuit 59 are supplied the inside noise detection signal NDI and the outside noise signal NDO having passed through the retriggerable monomulti-vibrator 61. The inside noise detection signal NDI is a signal supplied from the above-described noise detection section 8. The outside noise signal NDO is a signal supplied when noise is detected outside the apparatus. The OR circuit 59 supplies the noise detection signal ND to the TN time limit mask section 60, when either signal is input.

The TN time limit mask section 60 generates a noise mask signal NM when the noise detection signal is supplied from the OR circuit 59, and turns off the noise mask signal NM when the noise detection signal is detected continuously for a predetermined time (TN time). That is to say, the TN time limit mask section 60 does not output the noise mask signal NM continuously for more than TN time.

To the primary gain mask section 56 are input the forced-through signal TH and the noise mask signal NM. When these two signals are not supplied, the primary gain mask section 56 directly outputs the primary gain $G_1$ supplied from the primary gain conversion section 52. When the forced-through signal TH is supplied, the primary gain mask section 56 outputs forcibly the primary gain $G_1$ as 1 only for one period. When the noise mask signal NM is supplied, the primary gain mask section 56 outputs forcibly the primary gain $G_1$ as 0.

To the secondary gain mask section 57 are input the forced-through signal TH and the noise mask signal NM. When these two signals are not supplied, the secondary gain mask section 57 directly outputs the secondary gain $G_2$ supplied from the secondary gain conversion section 53. When the forced-through signal TH is supplied, the secondary gain mask section 57 outputs forcibly the secondary gain $G_2$ as 0 only for one period. When the noise mask signal NM is supplied, the secondary gain mask section 57 outputs forcibly the secondary gain $G_2$ as 0.

Figure 22:
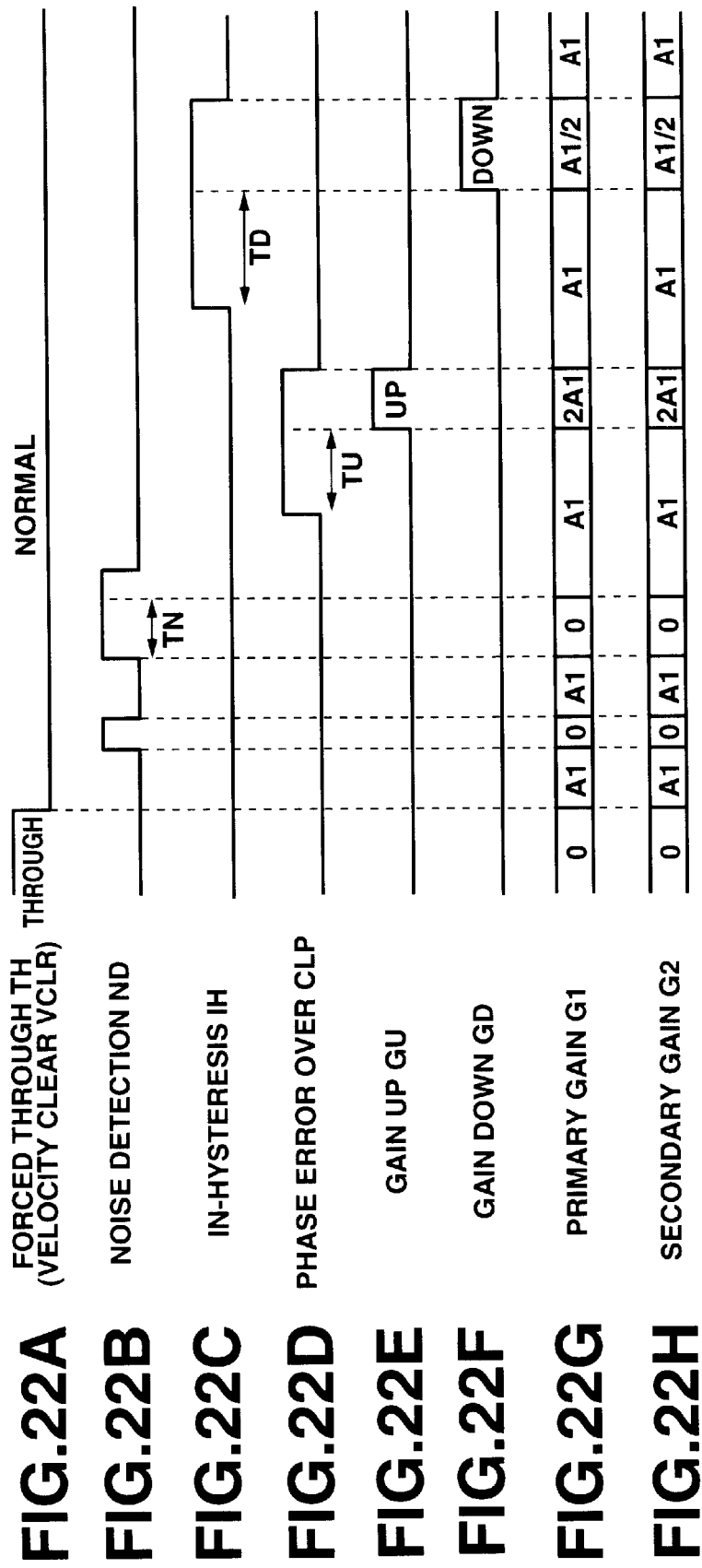
FIG. 22 is a timing chart for explaining the operation of the filter control section.

Next, the processing timing of the filter control section 9 will be described using a timing chart shown in FIG. 22.

At first, when the forced-through signal TH is input to the filter control section 9 at a timing shown in FIG. 22(A), the primary gain mask circuit 56 forcibly designates the primary gain $G_1$ as 1, as shown in FIG. 22(G), and the secondary gain mask circuit 57 forcibly designates the secondary gain $G_2$ as 0, as shown in FIG. 22(H). Also, the filter control section 9 outputs the velocity clear signal VCLR, when the forced-through signal TH is input. As a result, the PLL low pass filter 7 designates the gain of the first amplifier 32 which determines the feedback gain of the primary loop as 1. Also, the gain of the second amplifier 33 which determines the feedback gain of the secondary loop is designated as 0, and the velocity error data VEL is also designated as 0 by means of the velocity clear signal VCLR. Accordingly, the PLL low pass filter 7 can directly load the input angle data PI to the VCO 36, to thereby effect a state such that the input angle data PI is directly output, that is, there is no phase error.

For example, at the time of initial draw-in operation of the PLL just after the power-on, at the time of starting re-measurement operation or the like, the phase difference of input and output is too large, and there may be a case where the phase difference is 180° in the worst case. Thus, when the phase difference is large, long time course is necessary until the PLL low pass filter 7 performs stable operation. Therefore, just after the power-on or at the time of starting re-measurement operation, the forced-through signal TH is input to the filter control section 9, to thereby forcibly designate the phase difference between the input and output angle data of the PLL low pass filter 7 as 0. Hence, it is possible that the VCO 36 of the PLL low pass filter 7 starts draw-in of the PLL from a condition that there is only a phase error due to a noise component and a quantize error component, enabling a large reduction in the time until stable operation is effected.

Moreover, when the noise detection signal ND is input to the filter control section 9 at a timing shown in FIG. 22(B), the primary gain mask circuit 56 and the secondary gain mask circuit 57 forcibly designate the primary gain $G_1$ and the secondary gain $G_2$ as 0, as shown in FIG. 22(G) and FIG. 22(H). As a result, a burst of the PLL low pass filter 7 due to noise can be prevented. However, the condition that the feedback gain of the loop filter is 0 makes the control system an open loop condition, hence if this condition continues for a long time, the control system cannot follow the change in the input angle data PI. Accordingly, even if a noise is detected, if the noise continues for more than a predetermined time (TN time), the feedback gain is returned to the original state.

When the in-hysteresis signal IH is input to the filter control section 9 at a timing shown in FIG. 22(C), and continues for more than a predetermined time (TN time), a gain-down signal GD is output as shown in FIG. 22(F). When the gain-down signal GD is output, the cut-off frequency at that time (the primary gain $G_1$ and the secondary gain $G_2$) is one half the normal condition, as shown in FIG. 22(G) and FIG. 22(H), thereby the output noise of the PLL low pass filter 7 decreases to $1/\sqrt{2}$. Therefore, changes in the smoothed angle data PF output from the PLL low pass filter 7 can be further suppressed, to remain in the hysteresis range stably. When a change occurs in the angle data, and the change exceeds the hysteresis range, the cut-off frequency is returned to the original condition, to thereby ensure a desired responsibility.

Furthermore, when the phase error over signal CLP is input to the filter control section 9 at a timing shown in FIG. 22(D), to make the phase error of the PLL low pass filter 7 larger than ±45°, and the condition that the phase error exceeds 45° continues for more than a predetermined time (TU time), the filter control section 9 judges that the phase error is in a saturation state, and outputs a gain-up signal GU, as shown in FIG. 22(E). When the gain-up signal GU is output, the cut-off frequency at that time (the primary gain $G_1$ and the secondary gain $G_2$) increases to twice the normal condition, as shown in FIG. 22(G) and FIG. 22(H), thereby the response speed of the PLL low pass filter 7 increases twofold. As a result, when the phase error is large, high-speed follow-up can be effected.

(Response Limiting Section)

The smoothed angle data PF being smoothed angle data is supplied from the PLL low pass filter 7 to the response limiting section 10. The response limiting section 10 limits the momentary response speed (through rate and hysteresis) of the smoothed angle data PF and outputs response-limited angle data PH in which response is limited.

The smoothed angle data PF may have a large variation momentarily, when noise, quantize error, impact, vibration or the like occurs. In such a case, the two-phase increase and decrease pulse finally output from this apparatus basically must be counted for every count. However, a pulse may be jumped over by more than one count, and there is a possibility that the order of count value may be last. Accordingly, with the response limiting section 10 effects limitation such that when the variation in the smoothed angle data PF exceeds a certain level, the variation is clipped (through rate limitation).

Moreover, when noise, quantize error, minute vibration or the like occurs, the smoothed angle data PF may change, though a machine tool to be measured by the apparatus is stationary, that is, basically there is no change in the smoothed angle data PF. Therefore, the response limiting section 10 is provided with a dead band (hysteresis) to thereby effect limitation such that when the smoothed angle data PF only changes minutely, the variation is limited to 0, and in other portions, the change is delayed by the hysteresis portion.

Figure 23:
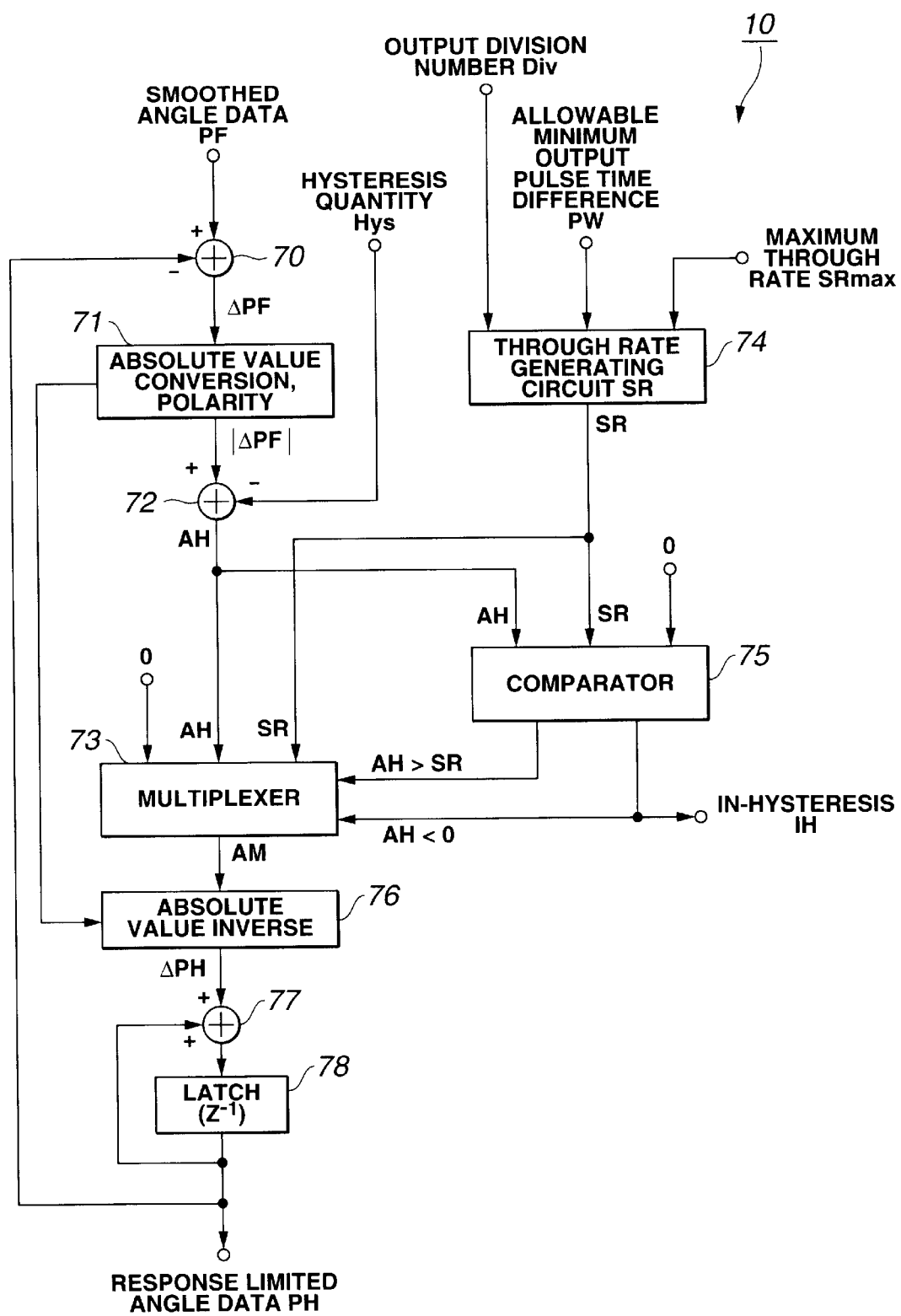
FIG. 23 is a block diagram of a response limiting section provided in the position detection apparatus.

FIG. 23 shows an example of a circuit construction of the response limiting section 10.

To the response limiting section 10 are input the smoothed angle data PF output from the PLL low pass filter 7, a hysteresis quantity Hys, output number of divisions Div, an allowable minimum output pulse time difference PW, and maximum through rate SRmax.

The hysteresis quantity Hys is a quantity showing a dead band width of the variation in the smoothed angle data PF. Hysteresis is provided in the positive direction and the negative direction, centering on the variation 0. Therefore, as the hysteresis quantity Hys, a value shown in an absolute value of the variation is input.

The output number of divisions Div is a count number of the two-phase increase and decrease pulse generated when the machine tool moves for one period λ of the position signal recorded on the scale 2. That is to say, it is a numerical value that decides the resolution of the apparatus. For example, the number of divisions is 40 divisions, 100 divisions, 360 divisions, 1000 divisions or The allowable minimum output pulse time difference PW is a minimum time width allowed when the two-phase increase and decrease pulse is counted up or counted down.

The maximum through rate SRmax is a value specifying a maximum value of the through rate.

The response limiting section 10 has a first subtractor 70, an absolute value conversion circuit 71, a second subtractor 72, a multiplexer 73, a through rate generating circuit 74, a comparator 7T, an absolute value inverse circuit 76, an adder 77 and a latch 78.

The smoothed angle data PF is input to the first subtractor 70, and the response limited angle data PH output from the latch 78 is also fed back and input. The first subtractor 70 subtracts the response limited angle data PH from the smoothed angle data PF, to thereby determine variation data ΔPF.

The absolute value conversion circuit 71 converts the variation data ΔPF determined by the first subtractor 70 into an absolute value, and supplies the polar information to the absolute value inverse circuit 76.

To the second subtractor 72 are input an absolute value |ΔPF| of the variation data determined by the absolute value conversion circuit 71, and the hysteresis quantity Hys. The second subtractor 72 subtracts the hysteresis quantity Hys from the absolute value |ΔPF| of the variation data, to thereby determine a subtraction value AH. The second subtractor 72 supplies the determined subtraction value AH to the multiplexer 73 and the comparator 75.

To the through rate generating circuit 74 are input the output number of divisions Div, the allowable minimum output pulse time difference PW, and maximum through rate value SRmax. The through rate generating circuit 74 performs the following calculation to thereby generate a limiting through rate value S:

$$SR=k/(PW*Div) \text{ (wherein k is a constant.)}$$

However, when k/(PW*Div) exceeds SRmax, the limiting through rate value SR is as follows:

$$SR=SR\text{max}.$$

The through rate generating circuit 74 supplies the generated limiting through rate value SR to the multiplexer 73 and the comparator 75.

Three signals; 0, subtraction value AH, limiting through rate value SR, are input to the multiplexer 73. The multiplexer 73 selects any of these three signals and outputs according to the control of the comparator 75. The output from the multiplexer 73 is supplied to the absolute value inverse circuit 76 as the response limited value AM.

To the comparator 75 are also input 0, subtraction value AH, limiting through rate value SR. The comparator 75 compares the subtraction value AH with 0, and with the limiting through rate value SR, and supplies a control signal to the multiplexer 73. The multiplexer 73 performs following operation according to the control of the comparator 75:

when AH<0, AM=0;
when AH>SR, AM=SR;
when 0<AH<SR, AM=AH.

The response limited value AM generated by the multiplexer 73 is supplied to the absolute value inverse circuit 76.

The absolute value inverse circuit 76 adds polar information transmitted from the absolute value conversion circuit 71 to the supplied response limited value AM, to thereby generate the variation data ΔPH of the response limited angle data.

Figure 24:
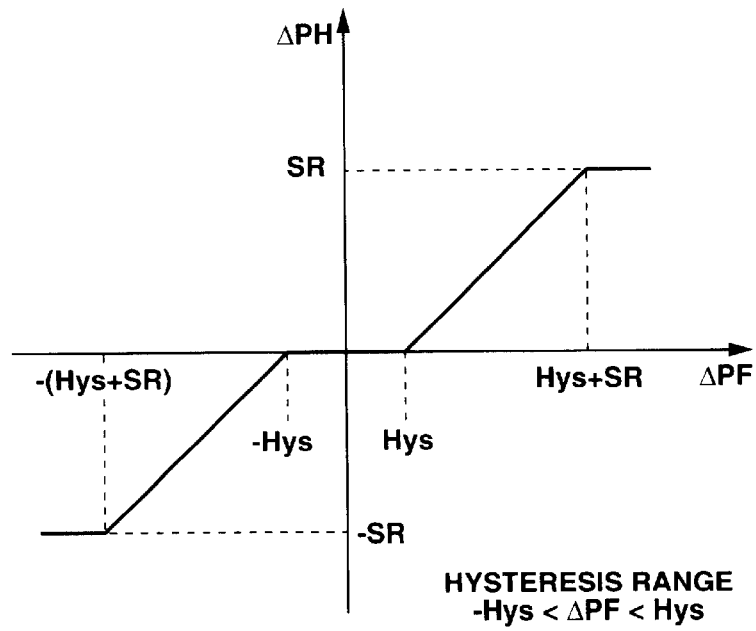
FIG. 24 is a diagram for explaining an input/output characteristic of the response limiting section.

The variation data ΔPH of the response limited angle data generated in this manner can obtain the hysteresis characteristic and through rate characteristic as shown in FIG. 24, with respect to the variation data ΔPH of the input smoothed angle data. That is to say, the range of −Hys<ΔPH<+Hys is the hysteresis range wherein the output is 0. Moreover, in the range of ΔPH<−(Hys+SR) or ΔPH>(Hys+SR), through rate limitation is effected, to thereby clip the output to SR. In other regions, the output follows the input linearly, with the output being delayed by the hysteresis quantity.

The latch circuit 78 latches the response limited angle data PH to be output by one clock component. The sampling clock of the first analog/digital conversion section 4 is input to the latch circuit 78.

The variation data ΔPH of the response limited angle data generated by the absolute value inverse circuit 76 and the response angle data PH one clock before, which is fed back from the latch circuit 78 are input to the adder 77. The adder 77 adds the variation data ΔPH and the response angle data PH one clock before, and stores the data in the latch circuit 78 as the response angle data PH.

When the variation in the smoothed angle data PF is small and is in the hysteresis range, the in-hysteresis signal IH is fed back to the filter control section 9. The filter control section 9 decreases the feedback gain of the PLL low pass filter 7 to thereby decrease the output noise, when the variation in the smoothed angle data PF is small and is in the hysteresis range, as described above.

As described above, the response limiting section 10 effects through rate limitation with respect to the input smoothed angle data PF, to thereby limit temporary increase in the allowable speed due to the noise, quantize error, impact, vibration or the like, and as a result, can prevent dropout of the count value of the two-phase increase and decrease pulse output from the apparatus, failure of order, and generation of a pulse having a time width narrower than an allowable range. Moreover, the response limiting section 10 can prevent change in the two-phase increase and decrease pulse due to noise or the like, and swinging in the positive and negative directions, in a stationary condition or in a condition close to stationary, that is, when any change does not occur basically in the input angle data PF, by providing hysteresis with respect to the input smoothed angle data PF. Furthermore, the response limiting section 10 can automatically set an optimum through rate limitation value by setting the allowable minimum output pulse time difference PW and the output number of divisions Div, enabling prevention of artificial mistake to thereby obtain a necessary and sufficient allowable speed at all times.

With this position detection apparatus 1, since the PLL low pass filter 7 is provided, hysteresis can be provided more efficiently, compared to a case where hysteresis is provided independently for the SIN signal and the COS signal.

Figure 25:
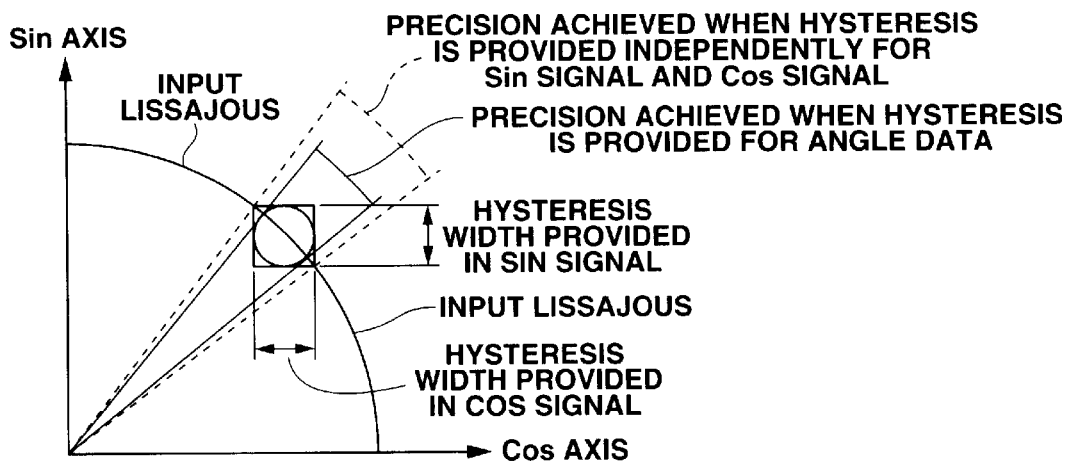
FIG. 25 is a diagram for explaining a difference in precision between a case where a hysteresis is directly provided in the SIN signal and the COS signal, and a case where a hysteresis is provided in the angle signal.

For example, as shown in FIG. 25, when a hysteresis is provided independently for the SIN signal and the COS signal, at a position of the worst angle (45°), the hysteresis region is square. If it is assumed that a Gaussian noise is included in the SIN signal and the COS signal, the distribution of the noise is circular centering on an angle position of the object. If a hysteresis is provided independently for the SIN signal and the COS signal to remove the Gaussian noise, it is necessary to provide a square hysteresis region which covers the circular distribution of the Gaussian noise. In this case, as shown in FIG. 25, at a position of the worst angle (45°), the hysteresis width on the input Lissajous figure is about √2 times the noise width to be generated. As a result, noise cannot be removed efficiently, resulting in deterioration in precision. However, according to this position detection apparatus 1, since a hysteresis is directly provided with respect to the angle data after the PLL low pass filter 7, the hysteresis width can cover the region of the generated noise at a necessity minimum level, enabling efficient removal of noise and improvement in precision.

(Output Pulse Generating Section)

The output pulse generating section 11 generates a two-phase increase and decrease pulse showing a movement position of a machine tool to be measured, and a reference origin pulse showing an origin of the movement position of the machine tool to be measured, based on the origin signal supplied from the head section 3 and the response limited angle data PH supplied from the response limiting section 10.

The two-phase increase and decrease pulse is a signal comprising an A phase signal and a B phase signal whose wavelength is shifted by ¼ with respect to each other, as described above, and the output pulse generating section 11 outputs four-count information encoded to a Gray code in one period. The output pulse generating section 11 generates the two-phase increase and decrease pulse incremented/decremented by one count, when the scale 2 and the head section 3 move relative to each other by a distance at the time of dividing one period λ of a position signal recorded on the scale 2 by an optional output number of divisions Div. That is to say, the output pulse generating section 11 generates a two-phase increase and decrease pulse incremented or decremented by one count, when the machine tool to be measured moves λ/Div.

The output number of divisions Div can be optionally set like 40 divisions, 100 divisions, 360 divisions, 1000 divisions, etc.

The output pulse generating section 11 also generates a reference origin pulse synchronized with the above-described two-phase increase and decrease pulse. In general, the position signal and the origin signal recorded on the scale 2 have different wavelength and their phase do not match each other. Hence, the output pulse generating section 11 generates a reference origin pulse that is always generated at a predetermined count position of the two-phase increase and decrease pulse.

Figure 26:
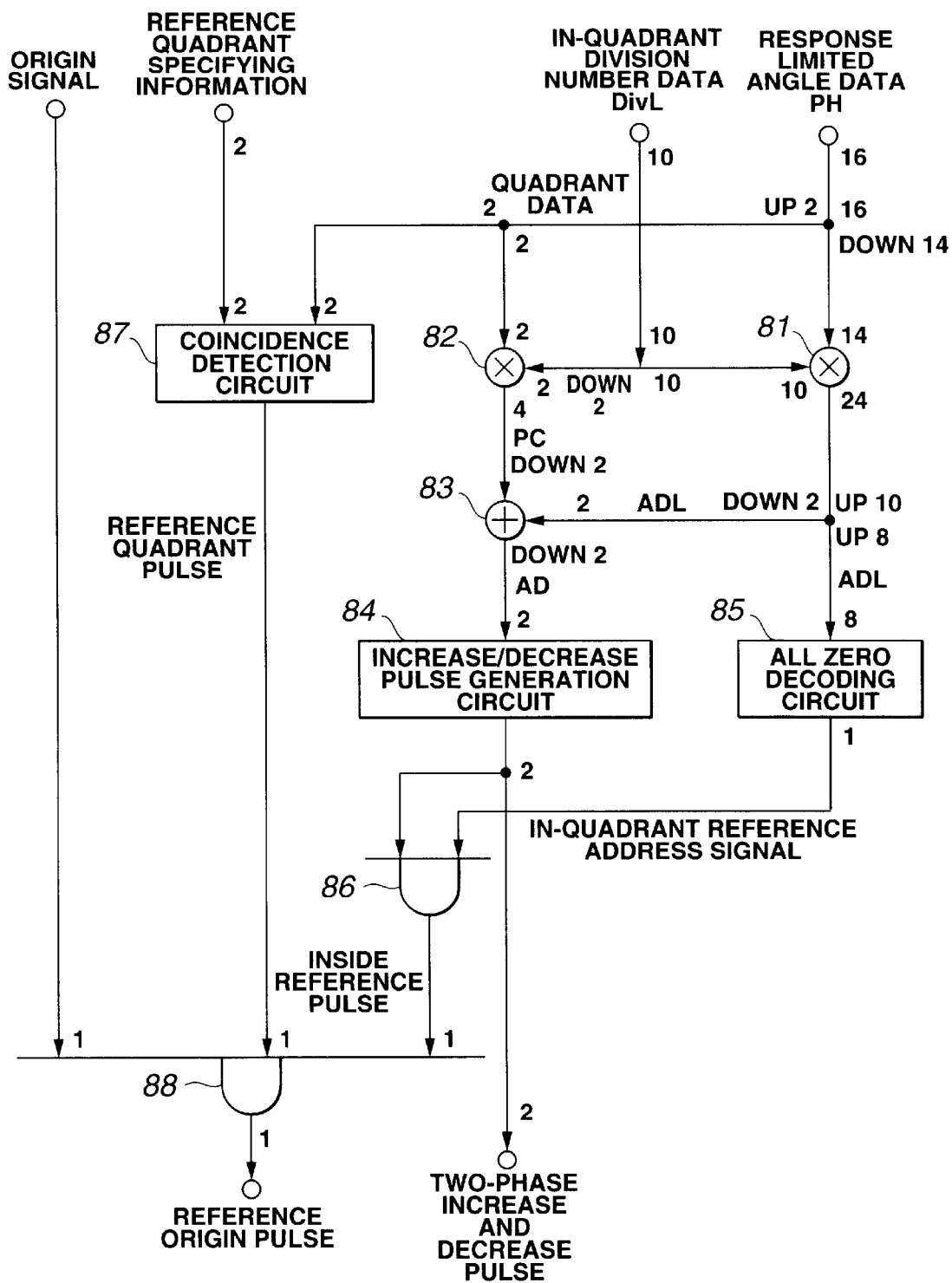
FIG. 26 is a block diagram of an output pulse generation section provided in the position detection apparatus.

Specifically, the circuit construction of the output pulse generating section 11 is shown in FIG. 26. Each numeral added to the right side or upper side of each data line shown in FIG. 26 shows the number of bits of the data input/output to each circuit. Also, characters "up" and "down" added to the left side of numeral added to each data line in FIG. 26 show the number of bits from the uppermost bit and from the lowermost bit of the data, respectively.

To the output pulse generating section 11 are input the origin signal supplied from the head section 3, the response limited angle data PH supplied from the response limiting section 10, in-quadrant number of divisions data DivL and reference quadrant specifying information.

The origin signal is a reproduced signal reproduced from the origin signal recorded on the scale 2 by the origin detection head 17 of the head section 3, and pulsed and supplied.

The response limited angle data PH is processed to binary data with 16 bits following a decimal, of which data one wavelength λ (360°) is counted as 1, before being input.

The in-quadrant number of divisions data are data showing the count number of the two-phase increase and decrease pulse output when the scale 2 and the head section 3 move for one quadrant (¼ wavelength) of the position signal, in a 10-bit binary number. That is to say, the in-quadrant number of divisions is data showing a value of ¼ the output number of divisions Div.

The reference quadrant specifying information are 2-bit information specifying a quadrant for generating a reference origin pulse.

The output pulse generating section 11 has a first multiplier 81, a second multiplier 82, a correction adder 83, an increase and decrease pulse generation circuit 84, an all zero decoding circuit 85, a first AND circuit 86, a coincidence detection circuit 87 and a second AND circuit 88.

The 16-bit response limited angle data PH is divided into the upper 2 bits and the lower 14 bits, with the upper 2 bits supplied to the coincidence detection circuit 87 and the second multiplier 82 as the quadrant data specifying the quadrant, and the lower 14 bits supplied to the first multiplier 81 as the in-quadrant angle data showing an angle in the quadrant.

All the 10 bits of the 10-bit in-quadrant number of divisions data DivL are supplied to the first multiplier 81, and only the lower 2 bits are supplied to the second multiplier 82.

The first multiplier 81 multiplies the lower 14 bits of the response limited angle data PH by 10 bits of the in-quadrant number of divisions data DivL, to thereby obtain 24-bit in-quadrant division unit address PDL.

Of the 24-bit in-quadrant division unit address PDL, the upper 10 bits are pulled out as the in-quadrant address ADL. The in-quadrant address ADL is a signal showing a relative position of the scale 2 and the head 3 in the quadrant, as shown in FIG. 27(A). If the in-quadrant number of divisions DivL is, for example, 25, values from 0 to 24 are repeatedly output for the in-quadrant address ADL for each quadrant, with the relative movement of the scale 2 and the head 3.

The in-quadrant address ADL is further divided into the upper 8 bits and the lower 2 bits, with the upper 8 bits supplied to the all zero decoding circuit 85, and the lower 2 bits supplied to the correction adder 83.

The second multiplier 82 multiplies the upper 2 bits of the response limited angle data PH by the lower 2 bits of the in-quadrant number of divisions data DivL, to obtain 4-bit correction address PC.

The lower 2 bits of the 4-bit correction address PC are supplied to the correction adder 83.

The correction adder 83 adds the lower 2 bits of the in-quadrant address ADL, that is, bits in the fifteenth place and the sixteenth place of the in-quadrant division unit address PDL and the lower 2 bits of the correction address PC, to thereby output the lower 2 bits as the lower 2 bits of an address in one wavelength AD. Here, as shown in FIG. 27(B), the address in one wavelength AD is a signal showing the relative position of the scale and the head 3 in one wavelength λ. For the address in one wavelength AD, if the output number of divisions Div in one wavelength λ is, for example, 100, values from 0 to 99 are repeatedly output for each wavelength λ, with the relative movement of the scale 2 and the head 3.

As shown in FIG. 27(C), the correction adder 83 calculates and outputs only for the lower 2 bits (AD0, AD1) in the address in one wavelength AD. The lower 2 bits (AD0, AD1) in the address in one wavelength AD is supplied to the increase and decrease pulse generation circuit 84.

The increase and decrease pulse generation circuit 84 encodes into the Gray code the lower 2 bits (AD0, AD1) in the address in one wavelength AD, and generates a two-phase increase and decrease pulse comprising an A phase signal and a B phase signal, as shown in FIG. 27(D). The two-phase increase and decrease pulse is output to the outside as the output signal of the apparatus. The two-phase increase and decrease pulse is also supplied to the first AND circuit 86.

The all zero decoding circuit 85 generates 1-bit in-quadrant reference address signal, when the upper 8 bits of the in-quadrant address ADL are supplied and all the data become zero. The upper 8 bits of the in-quadrant address ADL become data that are updated for every four clocks of the in-quadrant address ADL, that is, data that are updated for every one period of the two-phase increase and decrease pulse. The in-quadrant reference address signal output from the all zero decoding circuit 85 is a signal showing a starting position of each quadrant in each quadrant of the position signal recorded on the scale 2, as shown in FIG. 27(F). Here, the in-quadrant reference address signal is generated when all the upper 8 bits of the in-quadrant division unit address PDL become zero, but it may be generated when all the upper 8 bits thereof become not only zero but also any optional value. The in-quadrant reference address signal output from the all zero decoding circuit 85 is supplied to the first AND circuit 86.

As shown in FIG. 27(G), the first AND circuit 86 generates an inside reference pulse, when the two-phase increase and decrease pulse is a predetermined count (a count of any of 0 to 3 counts), and at a timing when the in-quadrant division unit address PDL is supplied. The inside reference pulse is supplied to the second AND circuit 88.

Here, a digit relation between data input and output with respect to the first multiplier 81, the second multiplier 82 and the correction adder 83 is shown in FIG. 28 and FIG. 29. In FIG. 28 and FIG. 29, digits which are not actually calculated are also shown in brackets.

Figures 28A, 28B:
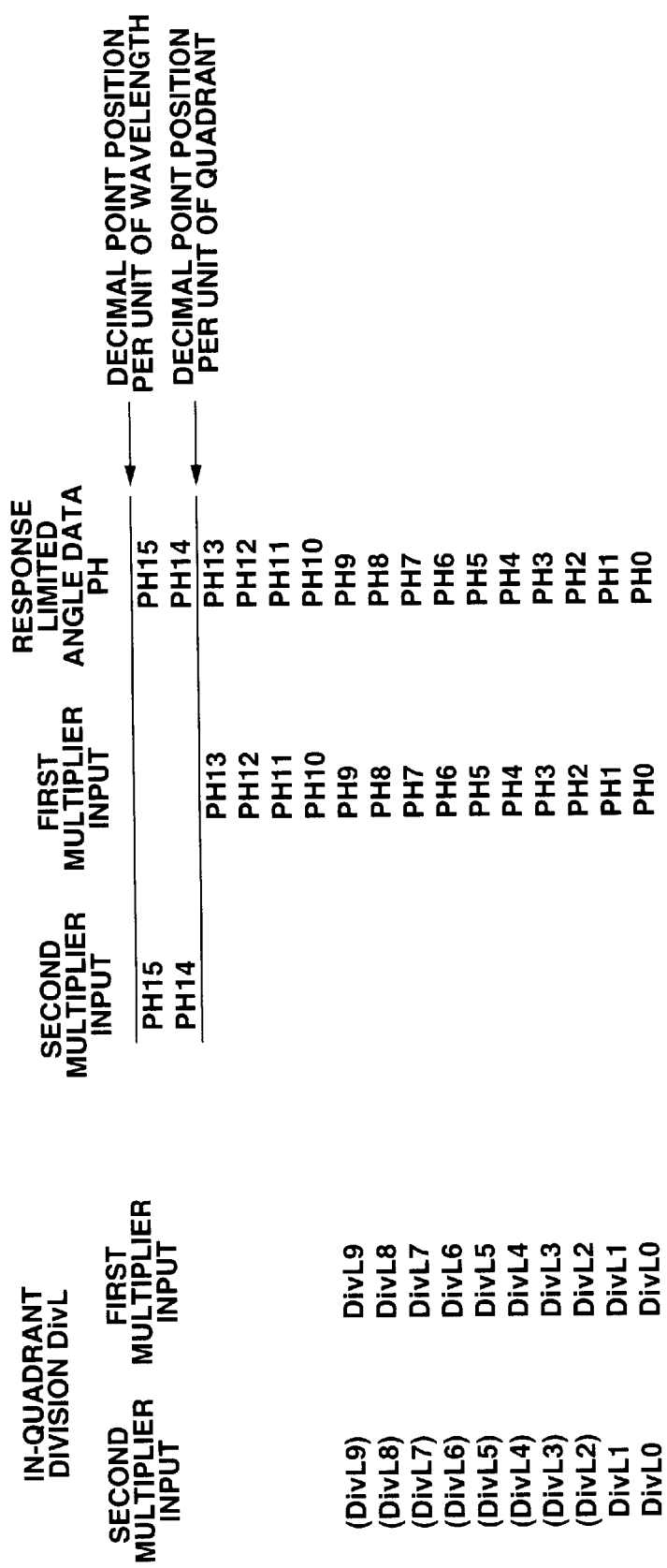
FIG. 28(A) is a diagram for explaining the in-quadrant number of divisions data input to a first multiplier and a second multiplier provided in the output pulse generation section.
FIG. 28(B) is a diagram for explaining the response limited angle data PH input to the first multiplier and a second multiplier.

As shown in FIG. 28(A), 10-bit in-quadrant number of divisions data DivL (DiVL0 to DivL9) are input to the first multiplier 81, and the lower 2 bits ((DiVL0 to DiVL1) are input to the second multiplier 82. Also, as shown in FIG. 28(B), 16-bit response limited angle data PH (PH0 to PH15) are input. With the 16-bit response limited angle data PH, a decimal point position per unit of one wavelength $\lambda$ is attached to the upper position of the most significant bit (PH15), and a decimal point position per unit of quadrant is attached to between the second bit (PH14) and the third bit (PH13) from the upper position. The 16-bit response limited angle data PH is divided into the upper 2 bits and the lower 14 bits, with the upper 2 bits (PH14 to PH15) input to the second multiplier 82, and the lower 14 bits (PH0 to PH13) input to the first multiplier 81.

As shown in FIG. 29, 24-bit in-quadrant division unit address PDL (PDL0-PDL23) are output from the first multiplier 81. From the second multiplier 82, 4-bit correction address PC ((PH14, PH15)*(DiVL0, DiVL1)=PC14, PC15, PC16, PC16) is output. Then, the correction adder 83 adds the lower 2 bits of the correction address PC and the upper tenth bit and eleventh bit (PDL14, PDL15) of the 24-bit in-quadrant division unit address PDL, to thereby output one wavelength division unit address AD (AD0, AD1).

To the coincidence detection circuit 87 are input the quadrant data comprising the upper 2 bits of the response limited angle data PH and the reference quadrant specifying information. The quadrant data is data showing four quadrants in one wavelength $\lambda$ of the position signal recorded on the scale 2, as shown in FIG. 30(A). The coincidence detection circuit 87 generates a reference quadrant pulse when the reference quadrant specifying information and the quadrant data coincide with each other. For example, when the second quadrant is specified by the reference quadrant specifying information, as shown in FIG. 30(B), the reference quadrant pulse is generated when the quadrant data is the second quadrant (1). The reference quadrant pulse is supplied to the second AND circuit 88.

To the second AND circuit 88 are input the reference quadrant pulse as shown in FIG. 30(B), the inside reference pulse as shown in FIG. 30(C), and the pulsed origin signal as shown in FIG. 30(D).

The second AND circuit 88 generates a reference origin pulse at a timing when all these signals become 1, as shown in FIG. 30(E).

As described above, the output pulse generation section 11 can calculate the two-phase increase and decrease pulse incremented and decremented by unit obtained by dividing one wavelength of the position signal recorded on the scale 2 by an optional number of divisions with a small amount of calculation, and output the calculated two-phase increase and decrease pulse. Moreover, the output pulse generation section 11 can output the reference origin pulse obtained by synchronizing the origin signal recorded in a predetermined place on the scale with the two-phase increase and decrease pulse.

What is claimed is:
1. A position detection apparatus comprising:
a recording medium on which a periodic position signal is recorded;
a detection section having a first detection head that moves relative to said recording medium along a recording direction of said periodic position signal for detecting said periodic position signal and producing a first detection signal, and a second detection head disposed apart from said first detection head by a predetermined distance in said recording direction that moves relative to said recording medium, operating with said first detection head, for detecting said periodic position signal and producing a second detection signal;
a polar conversion section for converting said first detection signal detected by said first detection head and said second detection signal detected by said second detection head into a 2-bit quadrant signal representing a relative position of said recording medium and said detection section in a quadrant in one period of said periodic position signal and an in-quadrant angle signal showing a relative position of said recording medium and said detection section as an angle in each quadrant; and
an output section for outputting a two-phase increase and decrease pulse, based on said 2-bit quadrant signal, said in-quadrant angle signal, and a division number signal showing a number of divisions in said quadrant of said periodic position signal, such that one said pulse is generated when said recording medium and said detection section move relative to each other for a distance obtained by dividing said quadrant of said periodic position signal by said number of divisions, wherein said output section comprises:
a first multiplier for multiplying said in-quadrant angle signal and said division number signal, and extracting a bit number equal to said division number signal from an upper bit in a multiplication result to generate an in-quadrant division address signal;
a second multiplier for multiplying a lower 2 bits of said division number signal and said quadrant signal;
an adder for adding a lower 2 bits of said in-quadrant division address signal output from said first multiplier and a lower 2 bits of a multiplication result of said second multiplier; and
an increase and decrease pulse generator for generating said two-phase increase and decrease pulse by encoding a lower 2 bits of a multiplication result of said adder.
2. A position detection apparatus comprising:
a recording medium on which a periodic position signal and an origin signal showing an origin position of said position signal are recorded;
a detection section having a first detection head that moves relative to said recording medium along a recording direction of said periodic position signal for detecting said periodic position signal and producing a first detection signal, a second detection head disposed apart from said first detection head by a predetermined distance in said recording direction that moves relative to said recording medium, operating with said first detection head, for detecting said periodic position signal and producing a second detection signal, and a third detection head that moves relative to said recording medium, operating with said first detection head for detecting said origin signal;

a polar conversion section for converting said first detection signal detected by said first detection head and said second detection signal detected by second detection head into a 2-bit quadrant signal representing a relative position of said recording medium and said detection section in a quadrant in one period of said periodic position signal and an in-quadrant angle signal showing a relative position of said recording medium and said detection section as an angle in each quadrant; and an output section for outputting a two-phase increase and decrease pulse, based on said 2-bit quadrant signal, said in-quadrant angle signal, said origin signal detected by said third detection head and a division number signal showing a number of divisions in said quadrant of said periodic position signal, such that one said pulse is generated when said recording medium and said detection section move relative to each other for a distance obtained by dividing said quadrant of said periodic position signal by said number of divisions, and a reference origin pulse generated when said position of relative movement of said recording medium and said detection section is an origin position, wherein said output section comprises:

a first multiplier for multiplying said in-quadrant angle signal and said division number signal, and extracting a bit number equal to said division number signal from an upper bit in a multiplication result to generate an in-quadrant division address signal;

a second multiplier for multiplying a lower 2 bits of said division number signal and said quadrant signal;

an adder for adding a lower 2 bits of said in-quadrant division address signal output from said first multiplier and a lower 2 bits of a multiplication result of said second multiplier;

an increase and decrease pulse generator for generating said two-phase increase and decrease pulse by encoding a lower 2 bits of a multiplication result of said adder;

an in-quadrant reference address generator for generating an in-quadrant reference address signal, when a signal excluding said lower 2 bits of said in-quadrant division address signal is a predetermined signal; and an origin signal generator for generating said reference origin pulse, when said origin signal is detected by said third detection head, said quadrant signal is a predetermined quadrant, said in-quadrant reference address signal is generated, and said two-phase increase and decrease pulse is a predetermined phase.

* * * * *